(12) United States Patent
Korenaga

(10) Patent No.: US 7,383,929 B2
(45) Date of Patent: *Jun. 10, 2008

(54) ANTI-VIBRATION TECHNIQUE

(75) Inventor: Nobushige Korenaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/782,785

(22) Filed: Feb. 23, 2004

(65) Prior Publication Data

US 2004/0164470 A1    Aug. 26, 2004

(30) Foreign Application Priority Data

Feb. 24, 2003  (JP) .............. 2003-046223

(51) Int. Cl.
  *F16F 7/10*  (2006.01)

(52) U.S. Cl. .............. 188/378; 267/136; 267/140.15; 310/12; 310/90.5; 318/135; 188/267

(58) Field of Classification Search .......... 188/267, 188/378, 164; 267/136, 140.14, 140.15, 267/140.5; 248/628, 550; 310/12–15, 90.5, 310/51; 318/135; 335/277, 285, 286; 104/281, 104/282, 283

See application file for complete search history.

(56) References Cited

U.S. PATENT DOCUMENTS

| | | | | |
|---|---|---|---|---|
| 4,684,315 A * | 8/1987 | Sugishima et al. | ...... | 414/749.2 |
| 5,159,219 A * | 10/1992 | Chu et al. | .......... | 310/90.5 |
| 5,196,745 A * | 3/1993 | Trumper | ........... | 310/12 |
| 5,294,854 A * | 3/1994 | Trumper | ........... | 310/90.5 |
| 5,467,720 A | 11/1995 | Korenaga et al. | ......... | 108/20 |
| 5,487,533 A * | 1/1996 | Kurita et al. | ........... | 267/140.5 |
| 5,518,550 A | 5/1996 | Korenaga et al. | ......... | 118/729 |
| 5,841,250 A | 11/1998 | Korenaga et al. | ......... | 318/135 |
| 5,876,012 A * | 3/1999 | Haga et al. | ........... | 248/550 |
| 5,986,743 A * | 11/1999 | Hanzawa | ........... | 355/53 |
| 5,990,587 A * | 11/1999 | Shimanovich et al. | ........... | 310/80 |
| 6,177,978 B1 | 1/2001 | Korenaga | ........... | 355/53 |
| 6,196,529 B1 * | 3/2001 | Shtarkman et al. | ........... | 267/140.14 |
| 6,359,677 B2 | 3/2002 | Itoh et al. | ........... | 355/53 |
| 6,496,248 B2 * | 12/2002 | Tanaka | ........... | 355/72 |
| 6,621,556 B2 * | 9/2003 | Iwasaki et al. | ........... | 355/53 |
| 6,954,041 B2 * | 10/2005 | Korenaga | ........... | 318/135 |
| 6,954,258 B2 * | 10/2005 | Emoto | ........... | 355/72 |
| 2003/0217694 A1 | 11/2003 | Korenaga | ........... | 118/500 |

FOREIGN PATENT DOCUMENTS

| | | | |
|---|---|---|---|
| JP | 04027696 A | * | 1/1992 |
| JP | 07267192 A | * | 10/1995 |
| JP | 8-270725 | | 10/1996 |

* cited by examiner

*Primary Examiner*—Robert A. Siconolfi
*Assistant Examiner*—Mariano Sy
(74) *Attorney, Agent, or Firm*—Fitzpatrick, Cella, Harper & Scinto

(57) ABSTRACT

An anti-vibration apparatus includes a first magnet unit arranged on a support target and including a first permanent magnet, and a second magnet unit including a pair of second permanent magnets. The pair of second permanent magnets is arranged to interpose the first permanent magnet without contact such that the same magnetic poles of the first and second permanent magnets oppose each other. Sizes of the first and second magnet units are set such that a force acting between the first and second magnet units in a direction perpendicular to a direction in which the first magnet unit supports the support target is zero in a relative positional range between the first and second magnet units.

12 Claims, 22 Drawing Sheets

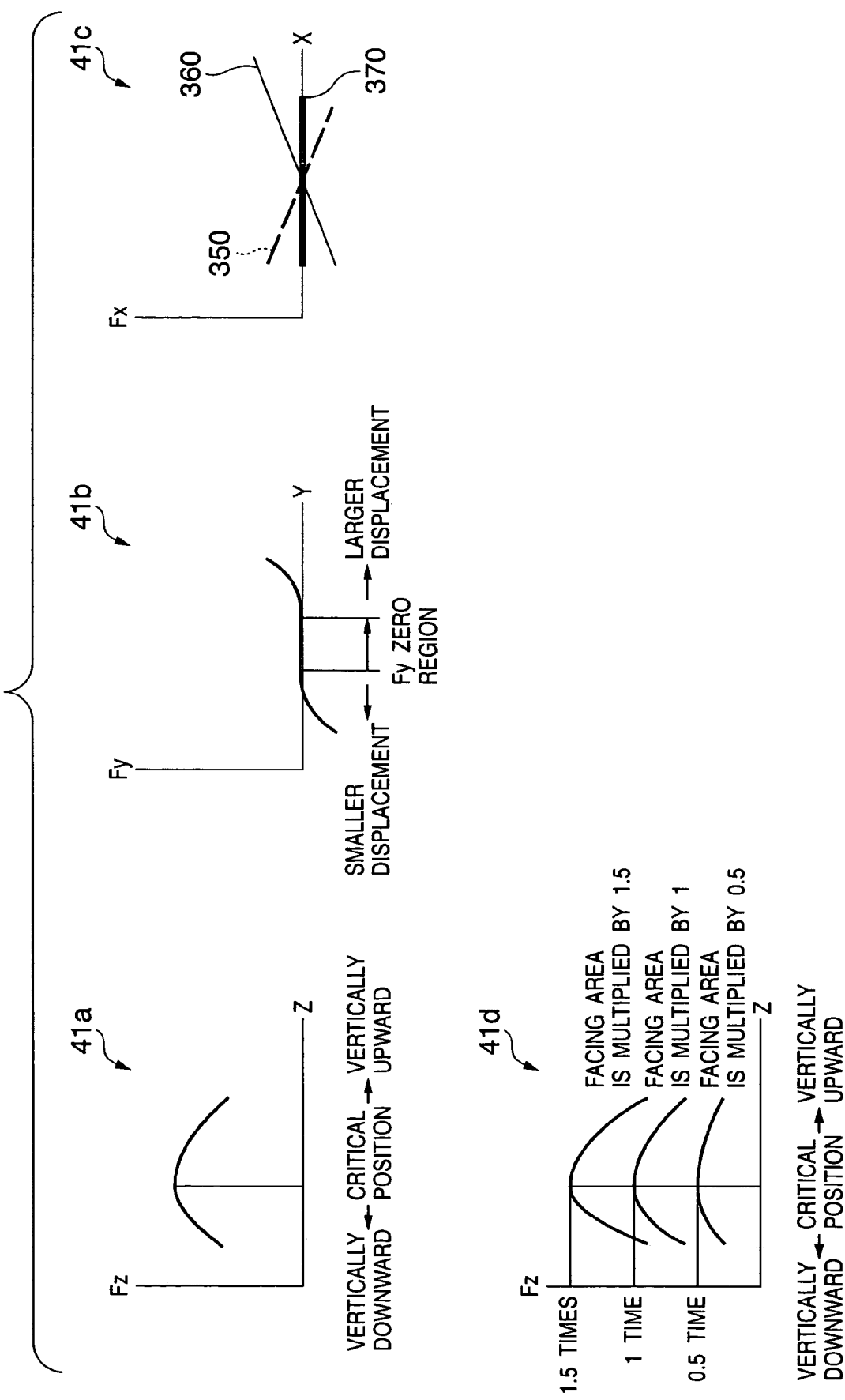

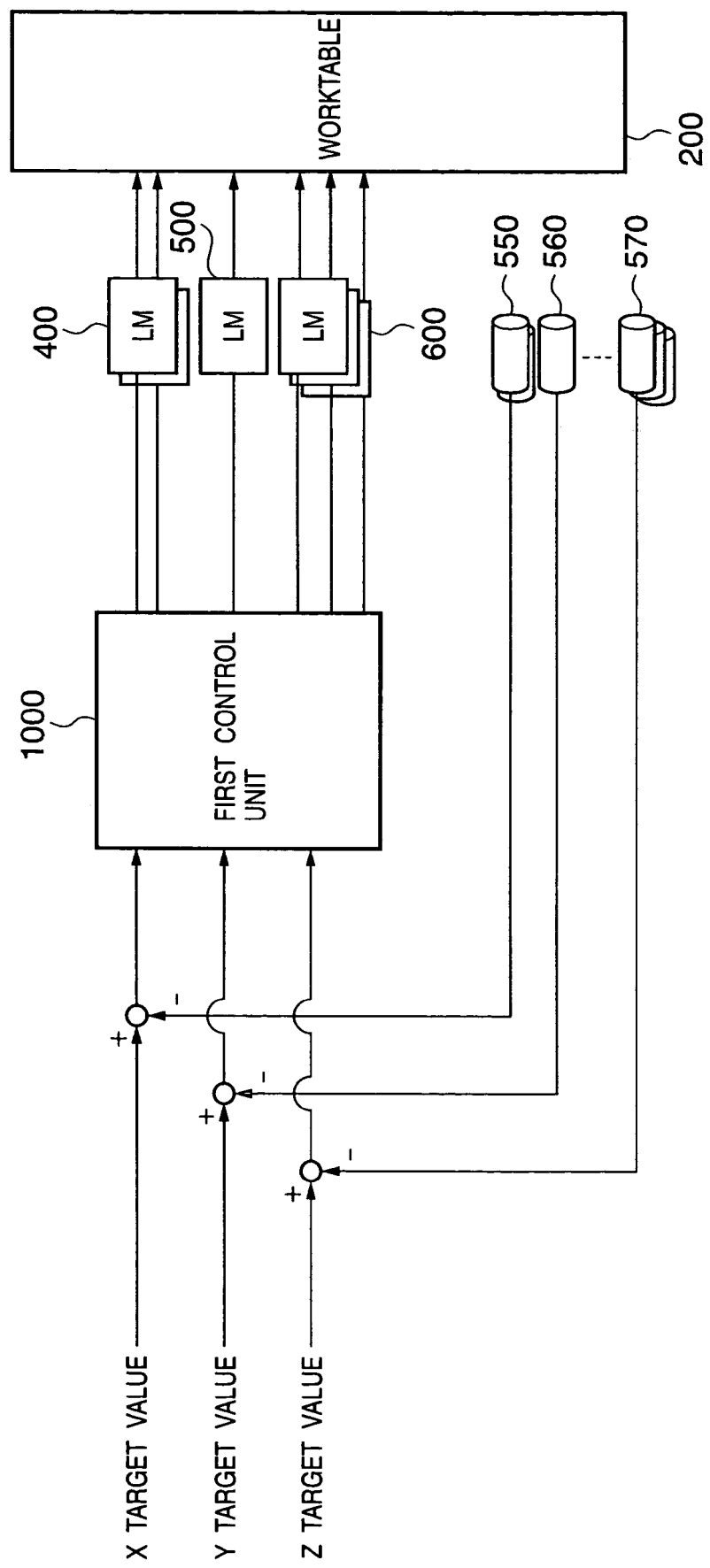

FLOW OF SEMICONDUCTOR DEVICE MANUFACTURE

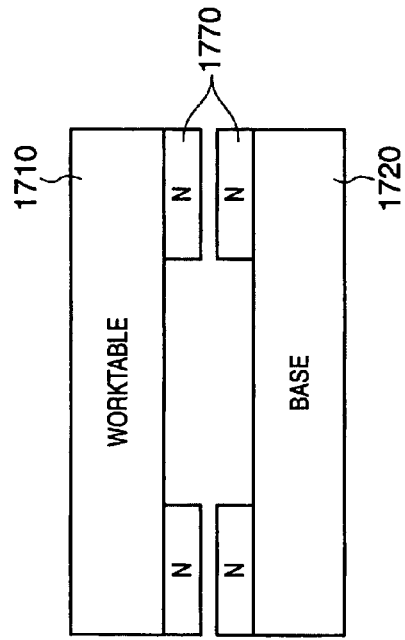
FIG. 18A
PRIOR ART
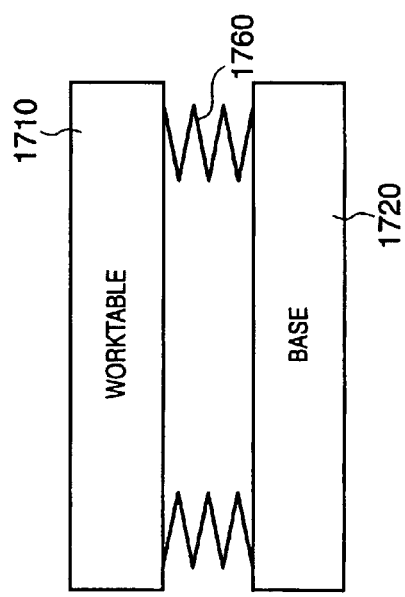
FIG. 18B
PRIOR ART
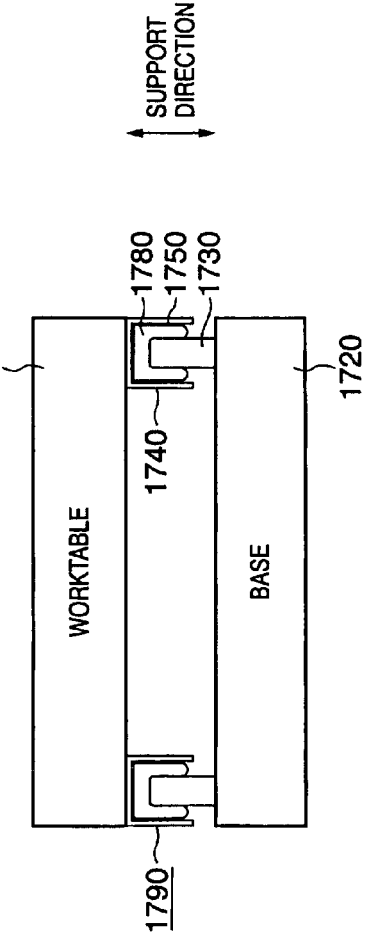
FIG. 18C
PRIOR ART
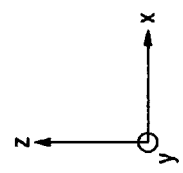

ANTI-VIBRATION TECHNIQUE

FIELD OF THE INVENTION

The present invention relates to an anti-vibration technique that, for example, can be applied to a semiconductor manufacturing apparatus such as an exposure apparatus.

BACKGROUND OF THE INVENTION

A conventional anti-vibration apparatus employs arrangements as shown in FIGS. 18A to 18C. In the arrangements shown in FIGS. 18A to 18C, as an anti-vibration element, one which utilizes the displacement of an elastic spring 1760 (FIG. 18A: spring support), one which utilizes the repulsive forces of homopolar magnets 1770 (FIG. 18B: repulsive magnet support), and one which utilizes the damping effect of rubber seal cylinders 1790 (FIG. 18C: rubber seal cylinder support) are respectively inserted between a base 1720 where a semiconductor manufacturing apparatus such as an exposure apparatus is placed and a worktable 1710 where a driving element such as an X-Y stage and other precision components and precision apparatuses are placed. Vibration propagating from the base 1720 is absorbed by such an anti-vibration element, so that the worktable 1710, or the entire exposure apparatus, or the like, is vibration-controlled.

Also, vibration caused by the driving reaction force generated by a driving element such as the X-Y stage arranged on the worktable 1710 is absorbed by the anti-vibration element described above, so that dark vibration propagating to the base 1720 is removed.

An example of such an anti-vibration apparatus is disclosed in Japanese Patent Laid-Open No. 08-270725.

Different anti-vibrating schemes shown in FIG. 18A to 18C have the following problems.

The rubber seal cylinder 1790 (FIG. 18C) serves as an air spring, and is constituted by a column 1730, cylinder 1740, and rubber seal 1750. The cylinder 1740 is filled with air 1780. When the column 1730 displaces, the air 1780 is compressed, and the spring constant of the air 1780 changes in accordance with the compressed state of the air 1780. Hence, according to this scheme, a large load is supported in the support direction. Even when the large load is supported, it can be absorbed as a displacement without propagating the force. The spring constant in the support direction (z direction) is set to a low value as an initial value. When a large load is received, the air 1780 in the cylinder 1740 is compressed in accordance with the load, so that the spring constant of the air 1780 increases. The load and the displacement of the spring gradually stabilize and are supported because of the balance of the load and air 1780.

As the spring constants in directions (x and y directions) perpendicular to the support direction (z direction) are larger than that in the support direction, a vibrating force of the x-y plane is undesirably likely to be transmitted to the worktable.

Assuming a large load in the support direction (z direction), the spring constant of the elastic spring 1760 (FIG. 18A) represented by a coil spring is limited to a certain degree due to the relationship with respect to an allowable displacement. Hence, it is difficult to support a large load and to set a small spring constant simultaneously. If the two demands are forced to be met, the spring itself may become large in size, or surging due to the spring mass may occur to degrade the anti-vibration performance.

This applies in a case wherein the repulsive forces generated by the homopolar magnets 1770 are utilized. If the homopolar magnets are set to face each other as shown in FIG. 18B to generate repulsive forces, to support a large load and to design a small spring constant in the support direction (z direction) cannot be achieved simultaneously. The anti-vibration performance of absorbing a force (large load) in the support direction as a displacement is limited to a certain degree. Hence, the force (large load) is undesirably likely to be transmitted to the worktable 1710 as an applied vibration source.

In the support scheme where an elastic body (spring) or magnets are used, the spring constant of the anti-vibration element is set in advance by setting constant load conditions for the worktable. When, for example, the X-Y stage described above is driven and serves as a moving load to change the barycenter of the worktable 1710, or when a component or the like to be placed is replaced, so that the load conditions for the worktable itself change, the support force cannot be changed accordingly.

SUMMARY OF THE INVENTION

The present invention has been proposed to solve the conventional problems, and has as its object to provide an anti-vibration technique including a support structure which suppresses transmission of a force in a direction perpendicular to a direction in which a support target is supported.

In order to achieve the above object, an anti-vibration apparatus according to the present invention is mainly characterized by having the following arrangements.

According to the present invention, the foregoing object is attained by providing an anti-vibration apparatus comprising:

a first magnet unit arranged on a support target and including a first permanent magnet; and a second magnet unit including a pair of second permanent magnets, the pair of second permanent magnets being arranged to interpose the first permanent magnet in noncontact with the first permanent magnet such that the same magnetic poles of the first and second permanent magnets oppose each other.

wherein sizes of the first and second magnet units are set such that no force acts between the first and second magnet units in a relative positional range between the first and second magnet units in a direction perpendicular to a direction in which the first magnet unit supports the support target.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4B includes graphs for explaining the relationship between the direction of displacement of the support unit and generation of a force;

FIG. 6D is a block diagram for explaining the control operation of the linear motor;

FIGS. 18A to 18C are views for explaining the arrangements of conventional anti-vibration apparatuses.

DETAILED DESCRIPTION OF THE PREFERRED EMBODIMENTS

Preferred embodiments of the present invention will now be described in detail in accordance with the accompanying drawings.

First Embodiment

Figure 1:
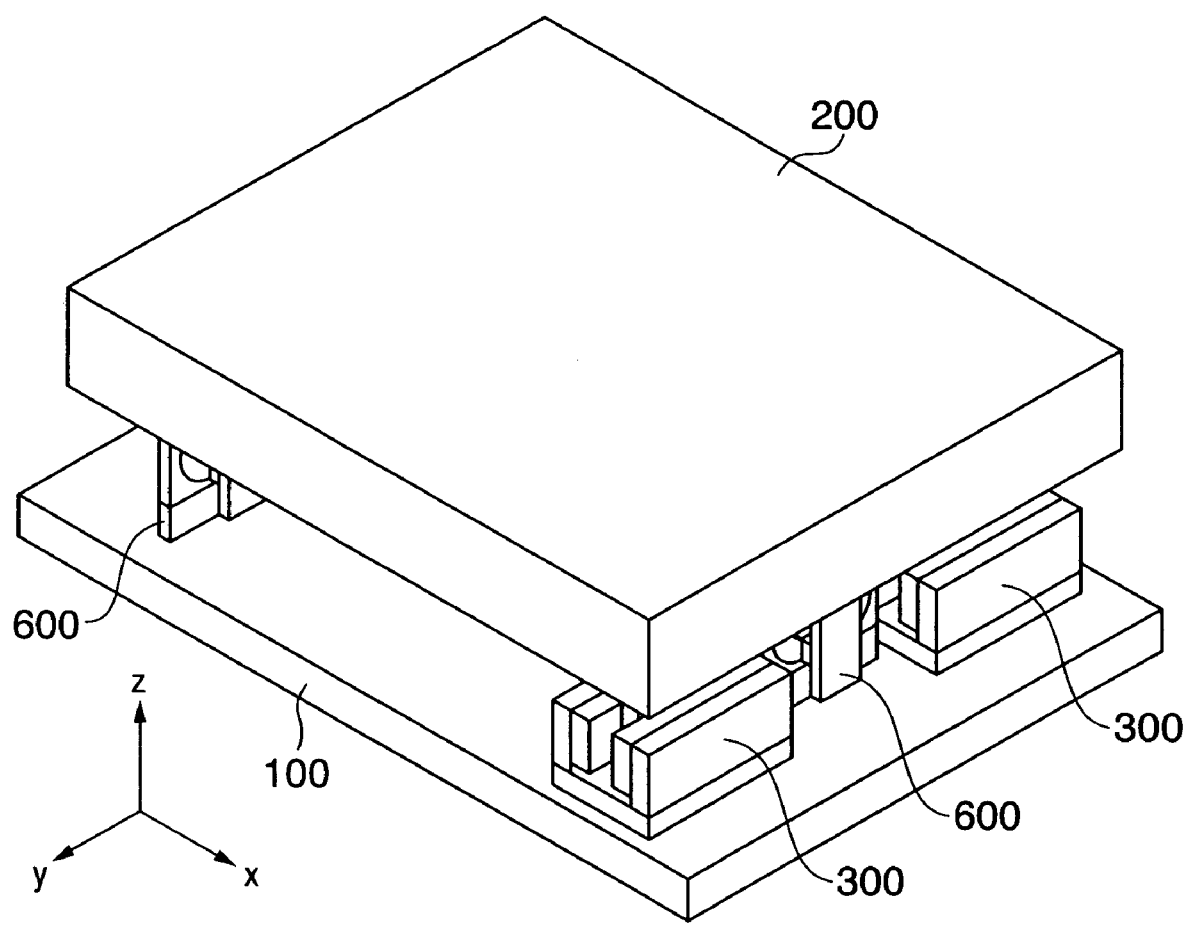
FIG. 1 is a view showing an overall arrangement in which support units and Z fine movement linear motors are arranged between a base plate and a worktable.

FIG. 1 is a view showing an overall arrangement in which support units 300 and Z fine movement linear motors 600 are arranged between a base plate 100 and worktable 200. The support units 300 are built on the base plate 100, and support the worktable 200. Precision components and precision devices (e.g., an alignment stage) (not shown) are placed on the worktable 200. The support units 300 prevent transmission of vibration to the worktable 200 from outside the base plate 100.

Figure 2:
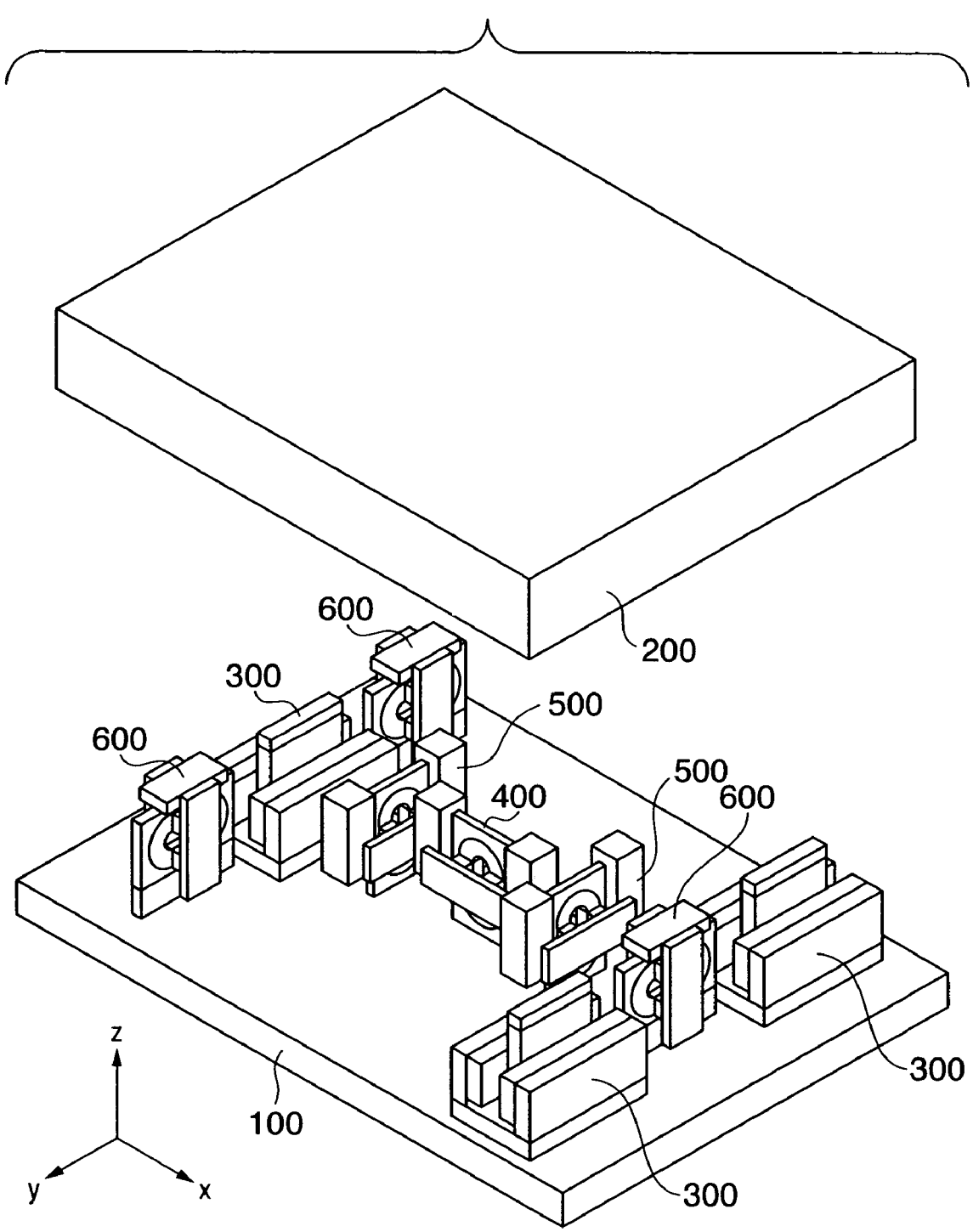
FIG. 2 is a view showing the layout of three support units, an X fine movement linear motor (one), Y fine movement linear motors (two), and Z fine movement linear motors (three) that are arranged on the base plate.

FIG. 2 is a view showing the layout of the three support units 300, an X fine movement linear motor (LM) 400 (one), Y fine movement linear motors 500 (two), and Z fine movement linear motors 600 (three) that are arranged on the base plate 100. The three support units 300 generate only support forces in the respective axes (X, Y, and Z directions), but substantially no force in response to displacement in directions other than the support direction, thus realizing an active anti-vibration performance. The six fine movement linear motors 600 aid the support units 300 and perform the control operation of holding the position and posture so that the worktable 200 is prevented from displacing largely from a predetermined position.

The arrangement of the fine movement linear motors and support units will be described.

(Arrangement of Fine Movement Linear Motor)

Figure 3A:
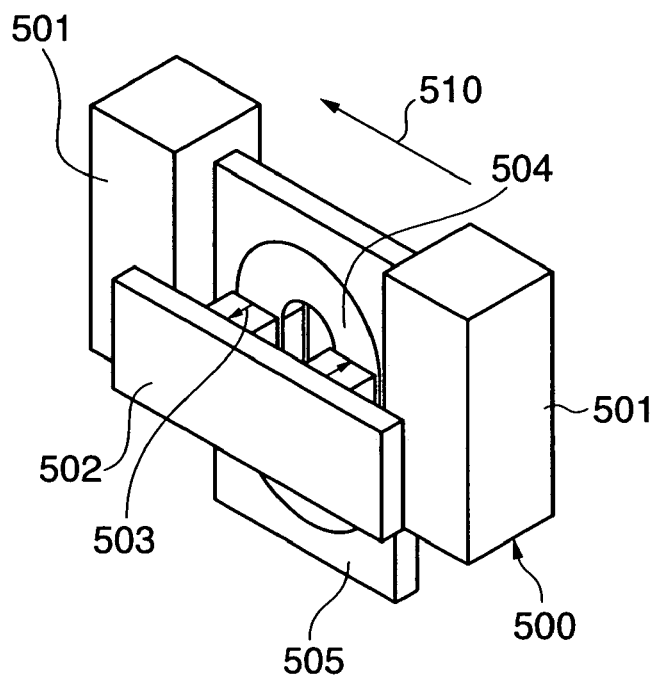
FIGS. 3A and 3B are views for explaining the structures of fine movement linear motors.
Figure 3B:
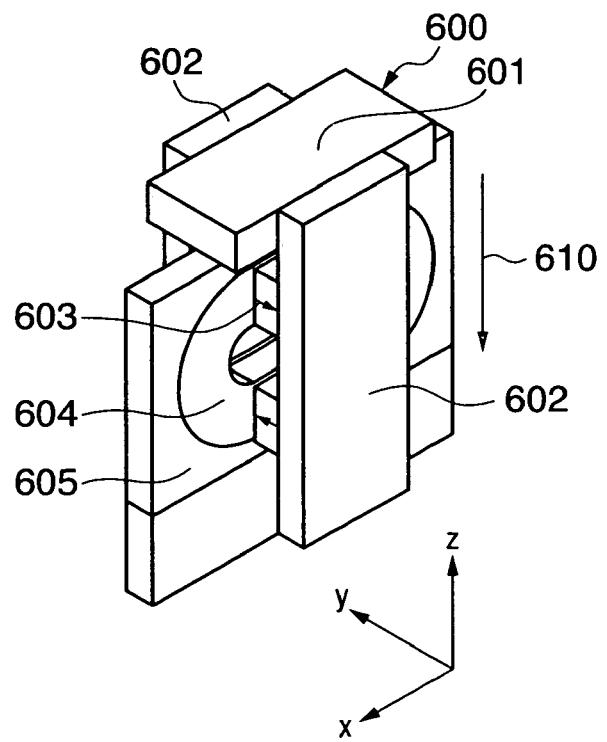

FIG. 3A shows the structure of the Y fine movement linear motor 500 in detail, and FIG. 3B shows the structure of the Z fine movement linear motor 600 in detail. The Z fine movement linear motor 600 has a Z yoke fixing plate 601, and two Z yokes 602 clamping the Z yoke fixing plate 601. Each Z yoke 602 has two-pole permanent magnets (Z magnets) 603 magnetized in the y direction (direction of thickness of the Z yoke 602). The permanent magnets 603 and a Z coil 604 face each other in a noncontact manner at predetermined gaps. The flat-track-shaped Z coil 604 is supported by a Z coil frame 605.

The Z yoke fixing plate 601 is fixed to the worktable 200, while the Z coil frame 605 is fixed to the base plate 100. When a current is supplied to the Z coil 604, a Z Lorentz force 610 in the Z direction is generated between the coil 604 and the Z magnets 603.

The Y fine movement linear motor 500 has two Y yoke fixing plates 501, and a Y yoke 502 is provided to the Y yoke fixing plates 501. The Y yoke 502 has two-pole permanent magnets (Y magnets) 503 magnetized in the x direction (direction of the thickness of the Y yoke). The permanent magnets 503 (Y magnets) and a Y coil 504 face each other in a noncontact manner. The flat-track-shaped Y coil 504 is supported by a Y coil frame 505. The Y yoke fixing plates 501 are fixed to the worktable 200, while the Y coil frame 505 is fixed to the base plate 100. When a current is supplied to the Y coil 504, a Y Lorentz force 510 in the Y direction is generated between the Y coil 504 and the Y permanent magnets 503.

Although not shown in FIGS. 3A and 3B, the X fine movement linear motor 400 has the same arrangement as that of the Y fine movement linear motor 500. When the X fine movement linear motor 400 is arranged by rotating its entire structure through 90°, it can generate an X Lorentz force in the X direction.

(Arrangement of Support Unit)

The practical arrangement of the support unit 300 shown in FIG. 1 will now be described with reference to FIG. 4A. The support unit 300 has yokes 301 and 305, a first permanent electromagnet 302, second permanent magnets 303, a bottom plate 304, and an attaching member 306 as its arrangement. The first and second permanent magnets 302 and 303 are magnetized in the direction of their thickness (X(Fx) direction in FIG. 4A). The pair of second permanent magnets 303 are arranged to clamp the first permanent magnet 302 from the two sides, so that the same pole surfaces of the two magnets (302 and 303) face in a noncontact manner.

The yokes 301 and 305 are arranged on the rear surfaces (opposite surfaces facing the first permanent magnet 302) of the second permanent magnets 303, and are fixed to the bottom plate 304. The second permanent magnets 303 are fixed to the base plate 100 (FIG. 1) through the bottom plate 304, and the first permanent magnet 302 is fixed to the worktable 200 through the attaching member 306. The first permanent magnet 302 is arranged with an offset in the support direction, which is upwards in the Z direction. Hence, repulsive forces in the Z direction act between the first and second permanent magnets 302 and 303.

Due to a reason to be described later, the size in the Y(Fy) direction is designed to satisfy:

$$\text{first permanent magnet} < \text{second permanent magnet} \quad (1)$$

Figure 4A:
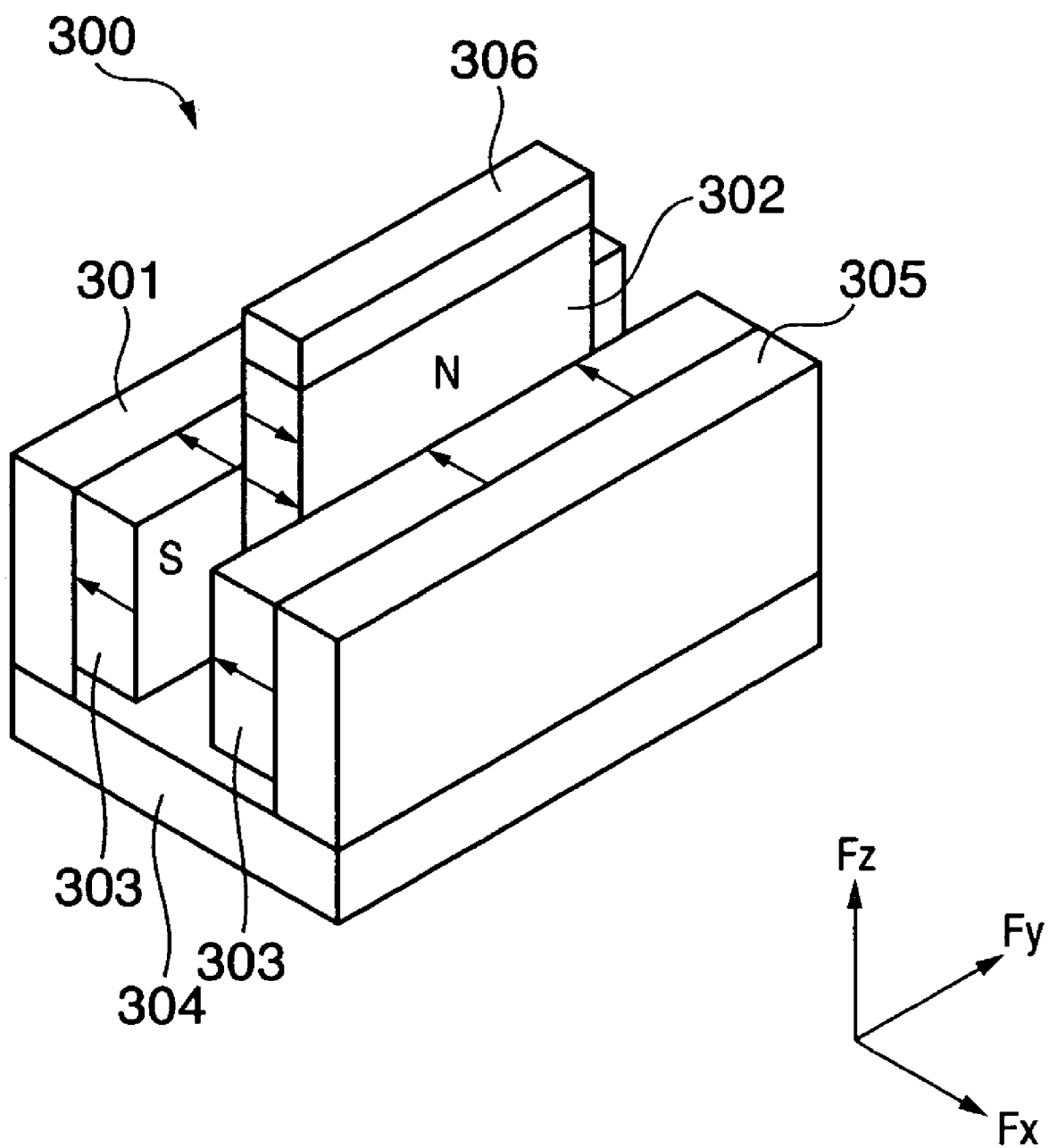
FIG. 4A is a view showing the structure of a support unit.

When the X, Y, and Z coordinate axes of the support unit 300 and forces Fx, Fy, and Fz generated in the directions of the axes are plotted along the directions of the coordinate system shown in FIGS. 4A and 4B, the relationships between the displacements and forces form characteristic curves shown in graphs 41a to 41c of FIG. 4A. The axes of the abscissas of the respective characteristic curves represent the displacements of the first magnet unit 302 in the X, Y, and Z directions, and axes of the ordinates represent the forces Fx, Fy, and Fz that act on the first permanent magnet 302.

The graph 41a of FIG. 4B shows the relationship between the displacement in the vertical direction (displacement in the Z direction) of the first permanent magnet 302 and the force (Fz) in the vertical direction. The force Fz reaches its peak at the critical position in the Z direction. The force (Fz) in the vertical direction decreases also when the first permanent magnet 302 displaces vertically upward or downward from the critical position as the boundary. The first permanent magnet 302 shows "spring characteristics" when it is located above the critical position, and "counter-spring characteristics" when it is located below the critical position.

The "spring characteristics" refer to the characteristics with which, when the displacement increases, a force acts in a direction to restore the displacement. The "counter-spring characteristics" refer to the characteristics with which, when the displacement increases, a force acts in a direction to further increase the displacement.

The characteristic feature of the characteristic curve of the graph 41a of FIG. 4B resides in that it has a critical position where the force Fz reaches its peak. At this position, the rate of change of the force generated by the first permanent magnet 302 in the vertical direction is zero.

More specifically, $$dFz/dz=0 \quad (2)$$

At the critical position, the spring constant becomes substantially zero, and no displacement occurs, even when an external force (vibration) is applied. Namely, the vibration transmissibility becomes substantially zero, and a large support force (Fz) can be generated. Accordingly, the support units 300 desirably support the worktable 200 by arranging their first permanent magnets 302 at the critical positions.

The graph 41b of FIG. 4B shows the relationship between the displacement in the Y direction of the first permanent magnet 302 generated when it moves along the surfaces of the second permanent magnets 303, and the Y-direction force (Fy), and includes a region ("Fy zero region" in the graph 41b of FIG. 4B) where the Y-direction force (Fy) becomes substantially zero in a certain displacement segment in the Y direction. If the displacement in the Y direction further increases, exceeding the Fy zero region, a Y-direction force (Fy) is generated in the direction to increase the displacement. Similarly, if the displacement decreases, exceeding the Fy zero region, a Y-direction force (Fy) is generated in the direction to decrease the displacement. The characteristic feature of the characteristic curve of the graph 41b of FIG. 4B resides in that it has a displacement region where the force in the Y direction is substantially zero, and that the vibration transmissibility is substantially zero in this region so that no force is generated in the Y direction. Accordingly, the support units 300 desirably support the worktable 200 by arranging their first permanent magnets 302 such that they are located within the Fy zero regions.

The Fy zero region effects its characteristic feature when the first and second permanent magnets are designed to satisfy a relationship:

$$\text{size in Y direction of second permanent magnet} > \text{size in Y direction of first permanent magnet} \quad (3)$$

(or a relationship reverse to it). The larger the size difference in the Y direction between the first and second permanent magnets, the larger the Fy zero region that can be ensured.

The graph 41c of FIG. 4B shows the relationship between the direction of gap (displacement in the X direction) between the first and second permanent magnets 302 and 303 and the X-direction force (Fx). The force (Fx) generated in the X direction shows different tendencies depending on the thicknesses of the yokes 301 and 305 attached to the rear surfaces of the second permanent magnets 303. In the first and second permanent magnets 302 and 303, as the same poles face each other, usually, spring characteristics caused by the repulsive forces act. That is, when the displacement increases, a force acts in a direction opposite to the displacement. When the yoke 305 is arranged on the rear surface of the second permanent magnet 303, the "counter-spring characteristics" are caused by the attracting forces of the first permanent magnet 302 and yokes 301 and 305. That is, when the displacement increases, a force acts in a direction to further increase the displacement.

Since the permanent magnets (302 and 303) show the spring characteristics as described above, the characteristics of the displacement in the direction of the gap (X direction) as the function of the force (Fx), which are obtained when the yoke 305 is attached, are the synthesis of the "counter-spring characteristics" and "spring characteristics". When the thicknesses of the yokes 301 and 305 are increased, the counter-spring characteristics become dominant, and the counter-spring characteristics are exhibited as a whole, so that the characteristics indicated by a broken line 350 in FIG. 4B are obtained. On the other hand, when the yokes 301 and 305 are made thin or eliminated, the spring characteristics become dominant, as a whole, and the characteristics indicated by a solid line 360 in FIG. 4B are obtained. When the yoke thicknesses are appropriately adjusted and designed, characteristics, as indicated by a solid line 370 in the graph 41c of FIG. 4B, in which the force shows no change in response to a displacement and the magnitude of the force itself is zero, are obtained. Therefore, when the support units 300 are formed by appropriately setting the thicknesses of the yokes 301 and 305, the vibration transmissibility can be set to substantially zero. This is desirable as the characteristics of the support unit 300.

The graph 41d of FIG. 4B shows the relationship between the displacement in the Z direction and the force (Fz) obtained when the facing area of the first and second permanent magnets 302 and 303 is changed by changing the size of the first permanent magnet 302 in the Y direction. The characteristics of the displacement in the Z direction as a function of the force change proportionally to the facing area. More specifically, when the facing area of the permanent magnets (302 and 303) is multiplied by 0.5, the characteristics become ½ that obtained when Fz is 1. When the facing area is multiplied by 1.5, the characteristics become 3/2 that obtained when Fz is 1. This suggests that as far as the facing area is variable, the force (Fz) to be generated can be variably controlled while maintaining the shape of the characteristic curve. An active anti-vibration apparatus which utilizes these characteristics will be described later in the second embodiment.

Considering the above characteristics, it is desirable to arrange the support units 300 by designing their arrangements such that, in the support state, they generate a support force only in the support direction while generating substantially no force in directions other than the support direction, so the force does not change in response to a displacement in the X, Y, or Z direction. It is, however, difficult to stably hold the position with only the support units 300. Hence, the position of the worktable 200 must be auxiliarily held independently of the support units 300. This is implemented by the six linear motors and six sensors.

Figure 5:
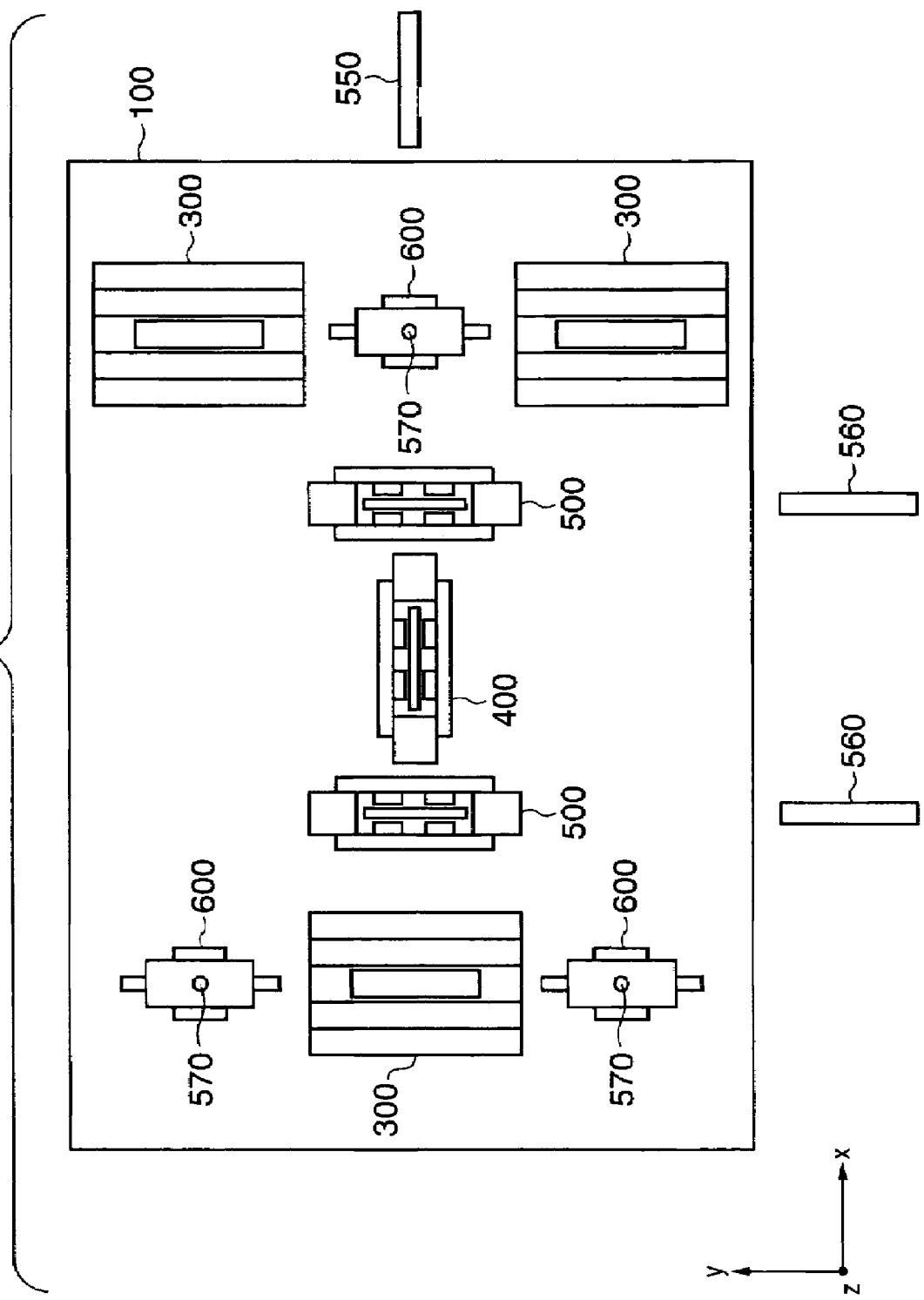
FIG. 5 is a view showing an arrangement example of the support units and fine movement linear motors on the base plate.

FIG. 5 is a view showing an example of the arrangement of the support units 300 and the fine movement linear motors on the base plate 100. Six gap sensors (550, 560, and 570) are arranged on the lines of action of the Lorentz forces of the six linear motors (the X fine movement linear motor [LM] 400 [one], Y fine movement linear motors 500 [two], and Z fine movement linear motors 600 [three]). The gap sensors (550, 560, and 570) measure the gaps with respect to the worktable 200. The positions of the fine movement linear motors (400, 500, and 600) of the respective axes are controlled by a control system as shown in FIG. 6D, so that the gaps between the gap sensors and the worktable 200 are maintained at substantially a constant value. If the servo gain is excessively large, it may transmit vibration. Hence, the control operation is desirably performed by weakening the control force (holding force) in the position-holding (servo lock) state (setting a small servo gain) such that the position of the worktable 200 does not deviate largely.

As the gap sensors (550, 560, and 570), absolute type sensors that can obtain an absolute value with the servo system being turned on are desirable. With the sensors of this type, even if the position control of the servo system is OFF, the position and posture of the worktable 200 can be grasped from the measurement values of the gap sensors. Thus, position control is turned on, and the electromagnets are driven, so that the worktable 200 can be restored to the desired position and posture.

When so-called incremental type sensors, that cannot obtain the absolute values of the displacement when the servo system is turned on, are used, an appropriate measurement value initializing means is necessary. In controlling the position and posture in the six axes with the fine movement linear motors (400, 500, and 600), the control force (holding force) need not be large, as described above, and only weak spring properties need be realized. Hence, an elastic spring system may replace the gap sensors. In this case, a stopper is desirably used together with the elastic spring system, so that a large displacement is prevented.

According to the above arrangement, an active anti-vibration apparatus having excellent vibration insulating characteristics can be realized, in which the three support units 300, each having the first and second permanent magnets (302 and 303) and yokes 301 and 305, which realize the setting conditions, including the critical position, the Fy zero region, and the yoke thicknesses described with reference to FIG. 4B, generate support forces only in the X-, Y-, and Z-axis directions while generating substantially no force in response to displacements in directions other than the support direction, so that an active anti-vibration performance is realized, and in which, when an unexpected disturbance is applied, a position and posture are held by a combination with weak position control of the six fine movement linear motors based on position measurement of the gap sensors.

Second Embodiment

An active anti-vibration apparatus according to the second embodiment of the present invention will be described with reference to FIGS. 6A to 12. In the second embodiment, the support units are formed by utilizing the characteristics shown in the graph 41d of FIG. 4B described in the first embodiment, so that the support force is variable.

Support units 300 generate only a support force in the support direction, and the position and posture are held by fine movement linear motors. This basic arrangement of the second embodiment is the same as that of the first embodiment. The arrangements of the respective fine movement linear motors are the same as those of the first embodiment, and a detailed description thereof will accordingly be omitted.

According to the second embodiment, precision devices placed on a worktable 200 have a moving mass. The active anti-vibration apparatus aims at coping with a change in acceleration or gravity caused by the moving mass.

Figure 7:
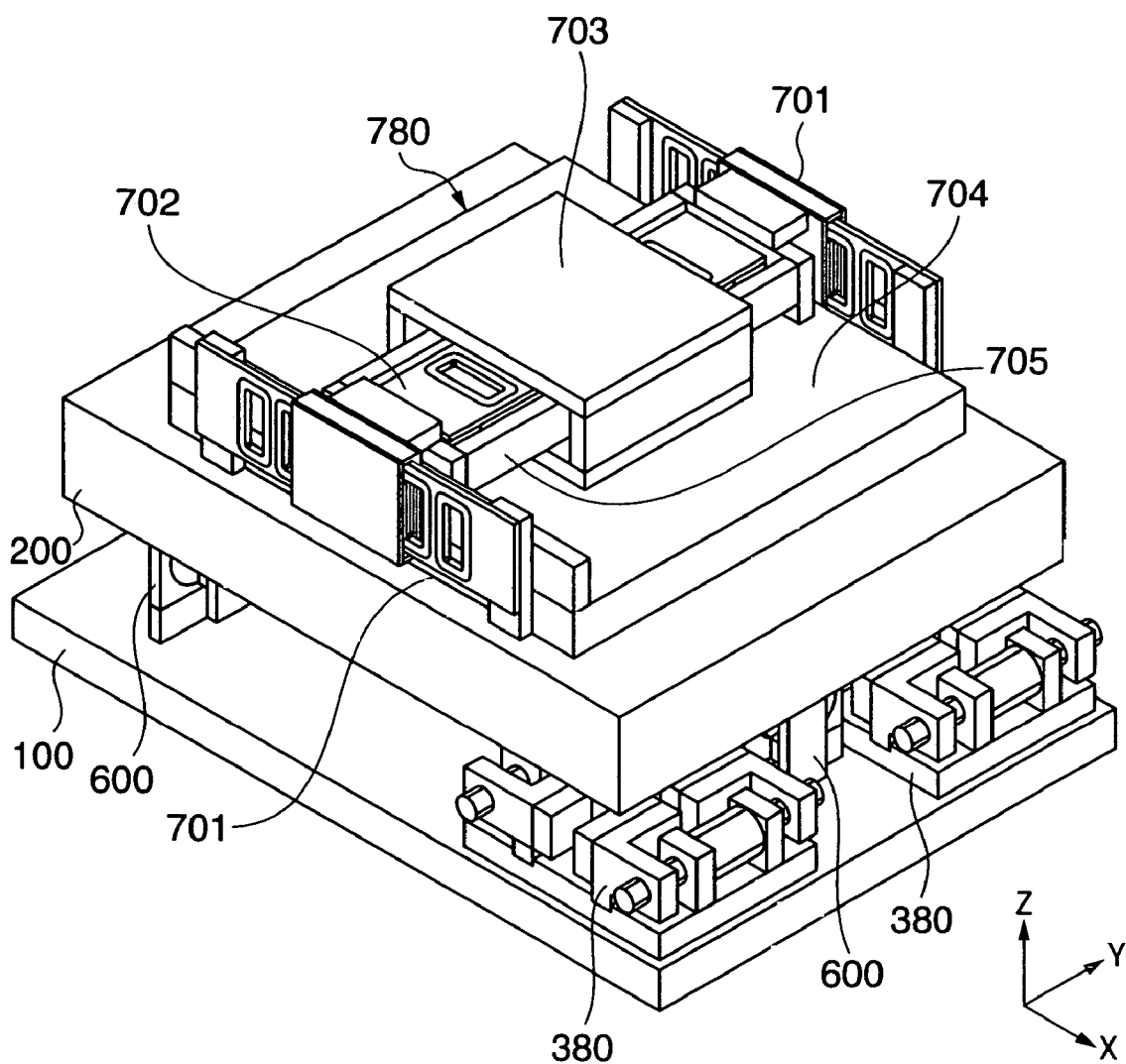
FIG. 7 is a view for explaining a state wherein an X stage and an X-Y stage for generating a moving load are arranged on the worktable.

As shown in FIG. 7, an alignment stage 780 constituted by an X stage 705 and X-Y stage 703 is placed on the worktable 200. The barycentric position on the worktable 200 changes when the X stage 705 and X-Y stage 703 are driven. The relationship between the time and position of each stage can be grasped in advance based on the control data of the stage. Accordingly, what change may occur in acceleration and gravity as time passes can be entirely calculated.

Figure 8:
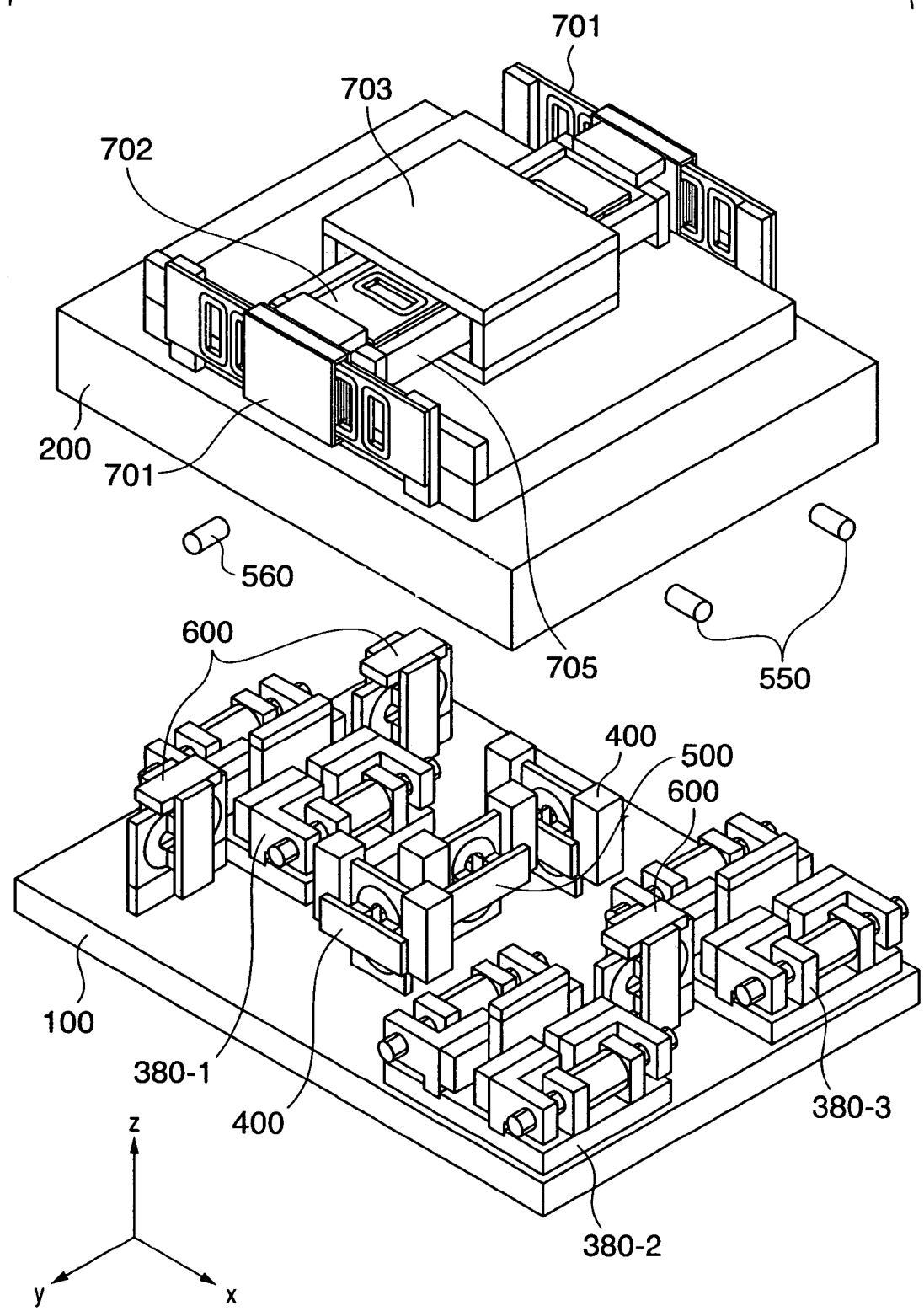
FIG. 8 is a view showing a state wherein three variable support units, six fine movement linear motors, and six gap sensors are arranged according to the second embodiment.
Figure 9:
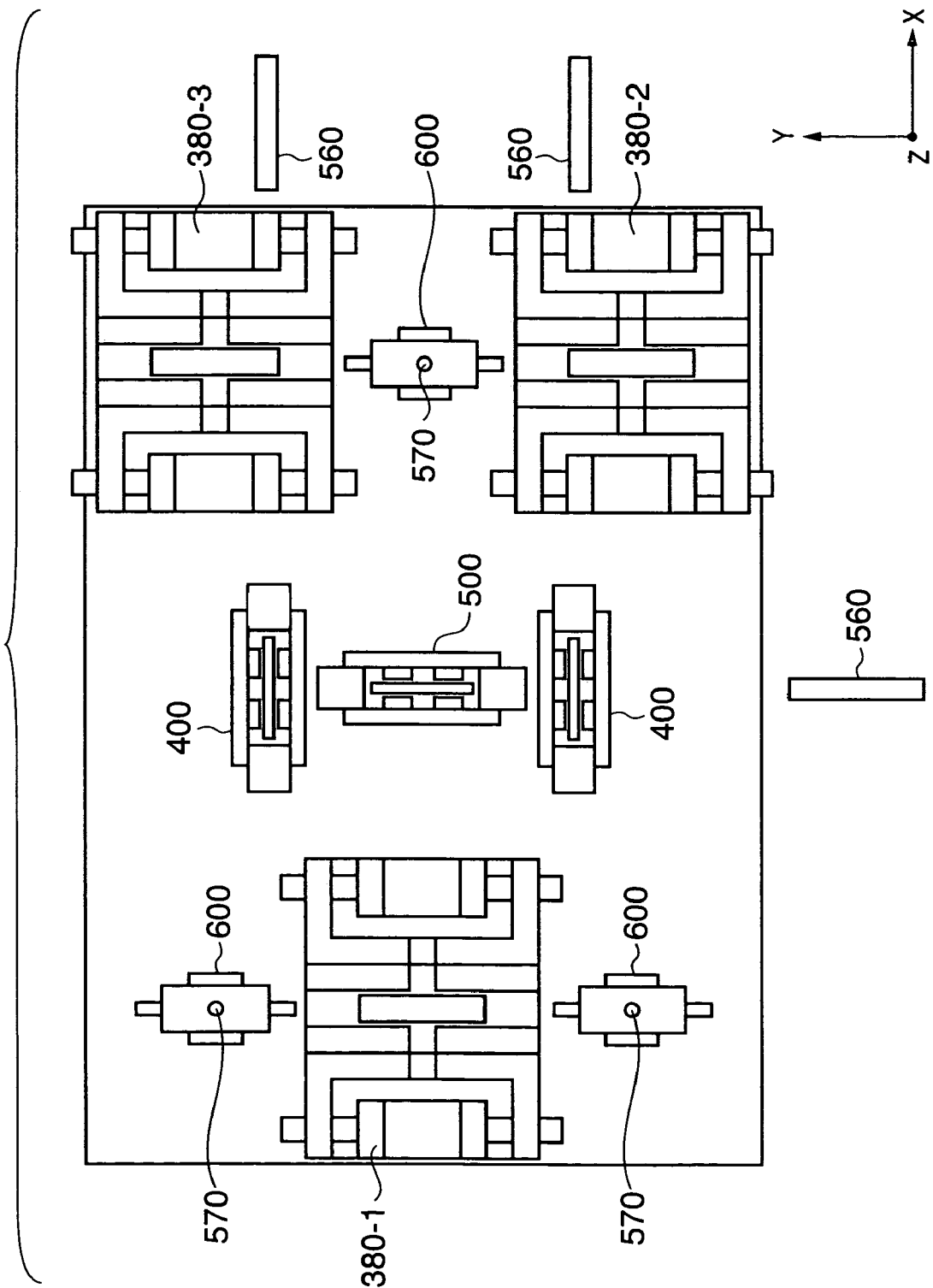
FIG. 9 is a view showing a state in a plan view wherein the three variable support units, six fine movement linear motors, and six gap sensors are arranged according to the second embodiment.

Three variable support units 380-1, 380-2, and 380-3, six fine movement linear motors (400, 500, and 600), and six gap sensors (550, 560, and 570) are arranged under the worktable 200 (see FIGS. 8 and 9). The arrangement of the six fine movement linear motors (400, 500, and 600) is different from that shown in FIG. 5 and described in the first embodiment, and includes the two X fine movement linear motors 400 (one in FIG. 5) and one Y fine movement linear motor 500 (two in FIG. 5). This is a variation of the arrangement example. The six gap sensors (550, 560, and 570) measure the position and posture of the worktable 200, and a control unit 1000 (see FIG. 6D) controls the six fine movement linear motors on the basis of the measurement data, so that the position and posture are held. These functions and effects are the same as those of the first embodiment.

(Arrangement of Variable Support Unit 380)

Figure 6A:
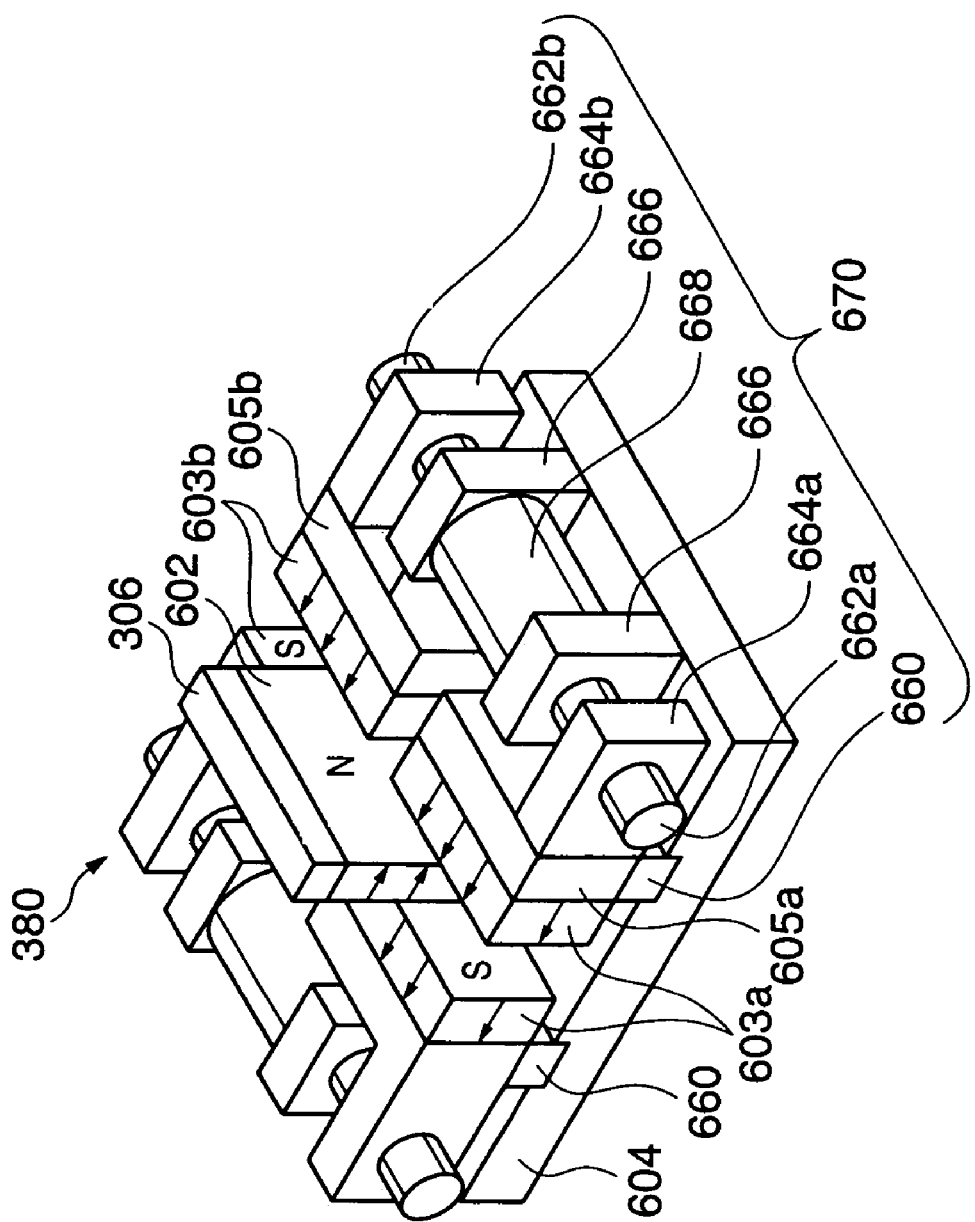
FIG. 6A is a view for explaining the structure of a variable support unit.

Regarding the three variable support units provided under the worktable 200, the arrangement of each variable support unit 380 will be described in detail with reference to FIG. 6A. Second permanent magnets 603a and 603b oppose each other in a noncontact manner to clamp a first permanent magnet 602. This structure is the same as that in the first embodiment. The second embodiment is different from the first embodiment in that each second permanent magnet is split into a front portion (603a) and rear portion (603b), as shown in FIG. 6A.

Each guide 660 arranged on a bottom plate 604 is a member that guides a yoke front portion 605a and yoke rear portion 605b, which support the second permanent magnets 603a and 603b, in the Y-axis (+/−) direction. A nut front portion 664a and nut rear portion 664b are attached to the yoke front portion 605a and yoke rear portion 605b, respectively.

Each motor 668 is fixed to the bottom plate 604 through brackets 666, and is coupled to feed screws 662a and 662b through couplings (not shown). The feed screw front portion 662a and feed screw rear portion 662b are threaded in opposite directions. For example, when the motor 668 rotates in a positive (+) direction, the nut front portion 664a rotates in the positive (+) direction while the nut rear portion 664b rotates in the negative (−) direction, so that they translate with the same pitch in the opposite directions. The movements of the nuts are transmitted to the yoke front portion 605a and yoke rear portion 605b, and the relative positional relationship between the second permanent magnets 603a and 603b is finally set.

Figure 6B:
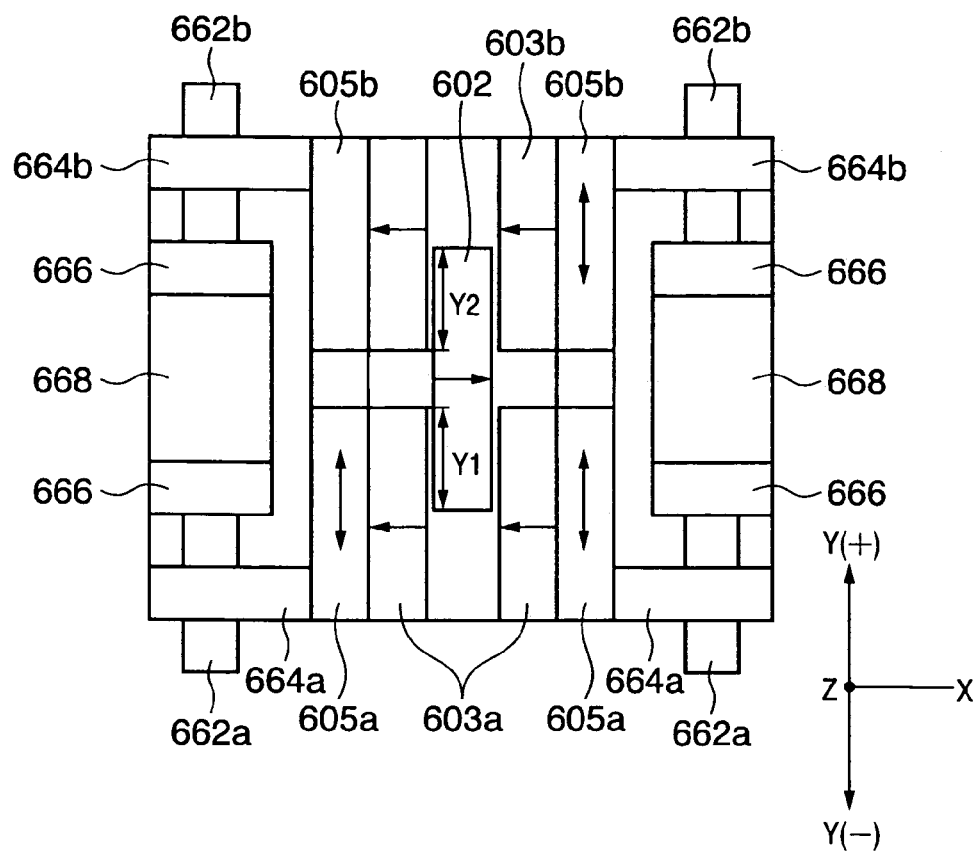
FIG. 6B is a view showing the arrangement of the variable support unit seen from an X-Y plane.

FIG. 6B is a view showing the arrangement of the variable support unit 380 seen from the X-Y plane. When the motor 668 drives the yoke front portion 605a and yoke rear portion 605b to move in the opposite directions along the Y-axis, sizes Y1 and Y2 through which the first permanent magnet 602 and the second permanent magnets 603a and 603b face each other change, and the facing area of the first permanent magnet 602 and second permanent magnets 603a and 603b changes proportionally to a facing size (Y1+Y2).

Figure 6C:
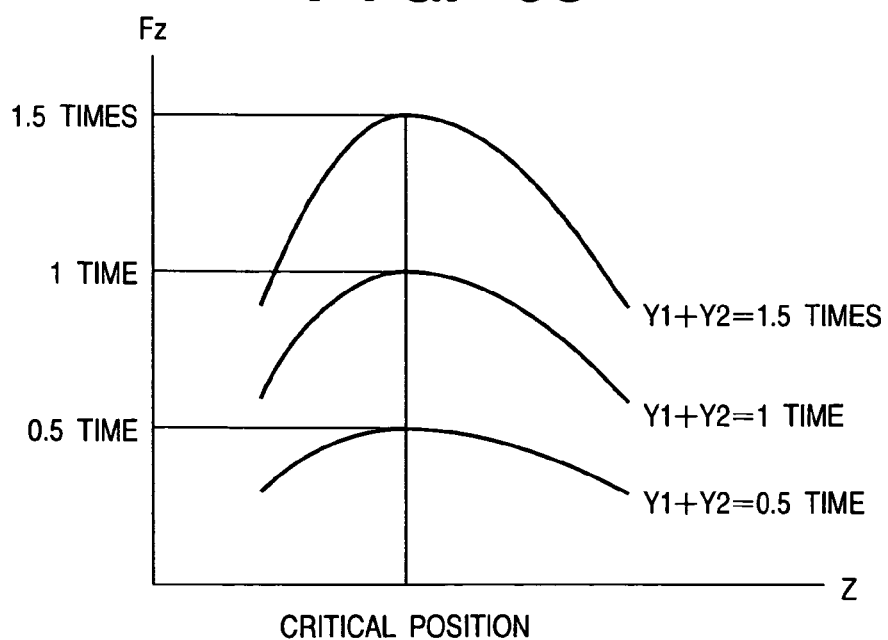
FIG. 6C is a graph showing the relationship between a facing size and a force (Fz) generated by the variable support unit in the Z direction.

The facing area and the force generated by the support unit are proportional, as described with the graph 41d of FIG. 4B. Thus, when the facing size (Y1+Y2) is changed, the force generated proportionally to it can be controlled. FIG. 6C is a graph showing the relationship between the facing size and the force (Fz) generated by the variable support unit in the Z direction. When the facing size (Y1+Y2) is multiplied by 0.5, the characteristics become ½ that obtained when Fz is 1. When the facing size is multiplied by 1.5, the characteristics become 3/2 that obtained when Fz is 1. If the facing size (Y1+Y2) is variable, the force to be generated can be controlled while maintaining the shape of the characteristic curve.

The driving operation of the motor 668 controls the positions of the second permanent magnets, so that the facing size (Y1+Y2) can be set variably. In position control of the second permanent magnets, a sensor 690 (see FIG. 6E) is provided to the driving system of the motor 668 to correspond to the yoke 605a (or 605b). The sensor 690 detects the movement amount (position) of the yoke front portion (605a). A second control unit 1100 drives the motor 668 such that the movement amount coincide with a target value, thereby controlling the yoke front portion 605a and yoke rear portion 605b to move to desired target positions. At this time, a control arithmetic operation unit 1400 calculates a deviation in the position information on the basis of the yoke target values and the detection information of the sensor. The control arithmetic operation unit 1400 then generates a motor driving command to set the deviation close to the target value gradually, and outputs it to the driver of the motor 668.

Position detection of the yokes 605a and 605b need not be performed by the sensor 690, but may be done by the control arithmetic operation unit 1400 by arithmetic operation on the basis of the detection of the amount of rotation of the motor 668 with an encoder and the pitch (feed amount per revolution of the screw) of each of the feed screw front portion 662a and feed screw rear portion 662b.

Once the force that should be generated by each support unit (380-1, 2, and 3) is obtained, the second control unit 1100 controls the positions of the yoke front portion 605a and yoke rear portion 605b so that the necessary force is generated. Thus, the variable support unit can generate a predetermined support force.

The force to be generated by each variable support unit in order to support a moving load, which is generated when the X-Y stage 703 moves, will be described with reference to FIG. 10.

Assume that the following coordinate values and forces will be expressed to correspond to numbers "-1", "-2", and "-3" added to the three variable support units 380-1, 380-2, and 380-3. For example, support point coordinates SP1 of the variable support unit 380-1 will be expressed as (X1, Y1), the force generated by the variable support unit 380-1 will be expressed as F1, and an amount in the variable support unit 380-1 which corresponds to the facing area will be expressed as S(Y11+Y21).

Similarly, support point coordinates SP2 of the variable support unit 380-2 will be expressed as (X2, Y2), the force generated by the-variable support unit 380-2 will be expressed as F2, and an amount in the variable support unit 380-2 which corresponds to the facing area will be expressed as S(Y12+Y22). Support point coordinates SP3 of the variable support unit 380-3 will be expressed as (X3, Y3), the force generated by the variable support unit 380-3 will be expressed as F3, and an amount in the variable support unit 380-3 which corresponds to the facing area will be expressed as S(Y13+Y23).

Figure 10:
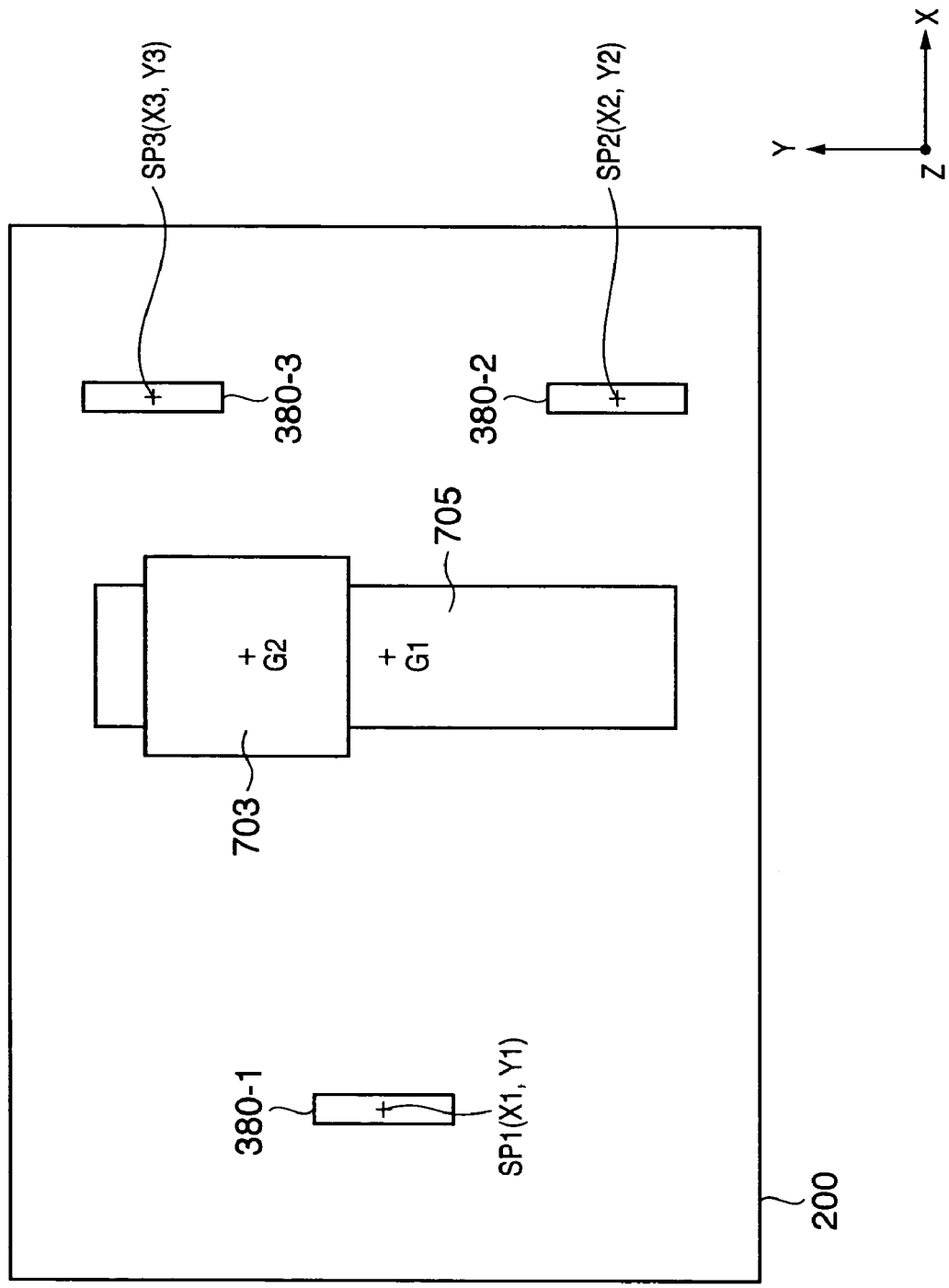
FIG. 10 is a view for explaining the relationship among forces generated by the respective variable support units in order to support the moving load generated when the X-Y stage moves.

In the arrangement including the X stage 705 and X-Y stage 703 shown in FIG. 10, assume that the mass of a body including the worktable 200 and causing no barycentric movement will be denoted as MK, its barycentric coordinates will be denoted as (XK, YK), the mass of the X stage 705 will be denoted as MX, barycentric coordinates G1 of the X stage 705 will be denoted as (XXj(t), YXj), the mass of the X-Y stage 703 will be denoted as MXY, and barycentric coordinates G2 of the X-Y stage 703 will be denoted as (XXYj(t), YXYj(t)).

Regarding the barycentric coordinates G1 and G2, as the X coordinate of the X stage 705 and the X and Y coordinates of the X-Y stage 703 change over time, they are expressed as functions of time (t).

The balance among these forces and the balance among these moments are expressed by the following equations (4) to (6) (note that "g" in the equations represents a gravitational acceleration):

$$F1+F2+F3+(MK+MX+MXY)g=0 \qquad (4)$$

$$F1 \times X1+F2 \times X2+F3 \times X3+(MK \times XK+MX \times XXj(t)+MXY \times XXYj(t))g=0 \qquad (5)$$

$$F1 \times Y1+F2 \times Y2+F3 \times Y3+(MK \times YK+MX \times YXj+MXY \times YXYj(t))g=0 \qquad (6)$$

By solving equations (4) to (6), forces F1(t), F2(t), and F3(t) that should be generated by the variable support units 380-1, 380-2, and 380-3 at each time point can be calculated.

Once F1(t), F2(t), and F3(t) are determined, facing sizes (Y11(t)+Y21(t)), (Y12(t)+Y22(t)), and (Y13(t)+Y23(t))

necessary for realizing generation of the forces can be determined. As the facing sizes are proportional to the generated forces as described above, the facing sizes necessary for realizing the generated forces can be determined uniquely. The facing sizes may be determined by repeating arithmetic operation each time the stage moves. Alternatively, in order to reduce the time necessary for the arithmetic operation and to eliminate the influence of rounding error of the arithmetic operation, the relationship between the facing sizes and the generated forces may be measured and formed into a table in advance. The table data may be looked up and output at a predetermined timing.

Once the facing sizes are determined, the motors 668 of the respective variable support units may be driven by using the facing sizes as the yoke target values. The control flow will be described in detail with reference to the block diagrams of FIGS. 11 and 12 that show the control block diagram of FIG. 6D in more detail.

An arithmetic operation unit 1200 receives respective coordinate information (X stage coordinates (XXj(t), YXj) and X-Y stage coordinates (XXYj(t), YXYj(t))) 1300 and solves simultaneous equations (4) to (6) on the basis of the coordinate information 1300, to obtain the support forces F1(t), F2(t), and F3(t). The coordinate information 1300 can be grasped in advance from the relationship between time and position on the basis of the control data of the respective stages. Accelerations and barycentric changes are calculated and input to the arithmetic operation unit 1200 as known data.

On the basis of the support force data F1(t), F2(t), and F3(t), the arithmetic operation unit 1200 calculates the facing sizes (Y1j+Y2j) (j=1 to 3) proportional to them, and outputs the facing sizes as the movement target values of the split magnets for the respective motors 668-1, 668-2, and 668-3.

Figure 6E:
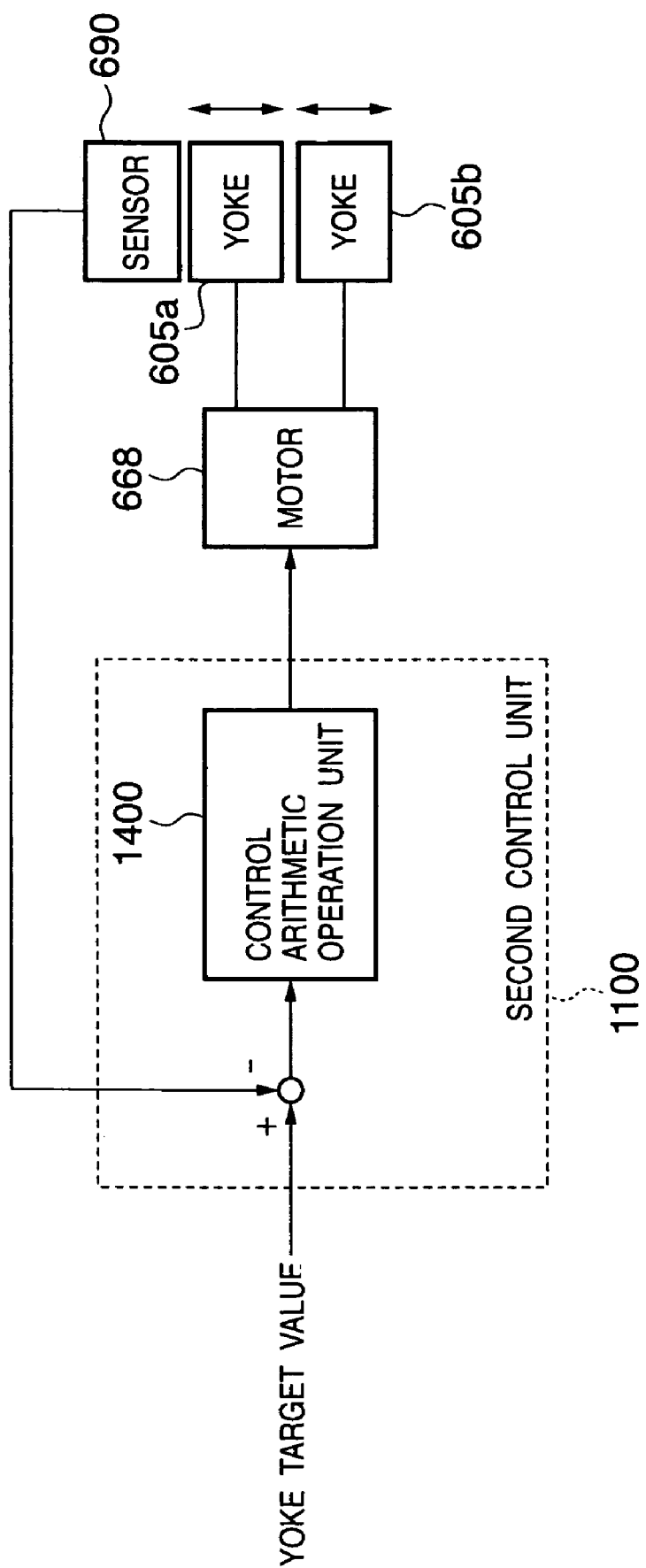
FIG. 6E is a block diagram for controlling the driving operation of yokes in the variable support unit.

The second control unit 1100 shown in FIG. 6E includes first, second, and third control arithmetic operation units 1400-1, 1400-2, and 1400-3 that generate control commands for controlling the motors in the directions of the respective axes. Each unit generates a motor driving command in accordance with a deviation Δ between the sensor information and the movement target value of the split magnets obtained by the arithmetic operation unit 1200, and outputs the motor driving command.

When a motor 668-*j* (j=1 to 3) drives a yoke front portion 605*a*-*j* and yoke rear portion 605*b*-*j* (j=1 to 3), if the facing size changes quickly, a response delay occurs. Due to the response delay, sometimes the force that should originally be generated by the variable support unit cannot become a required value, but the resultant support force exceeds the target support force or does not reach the target support force.

Figure 11:
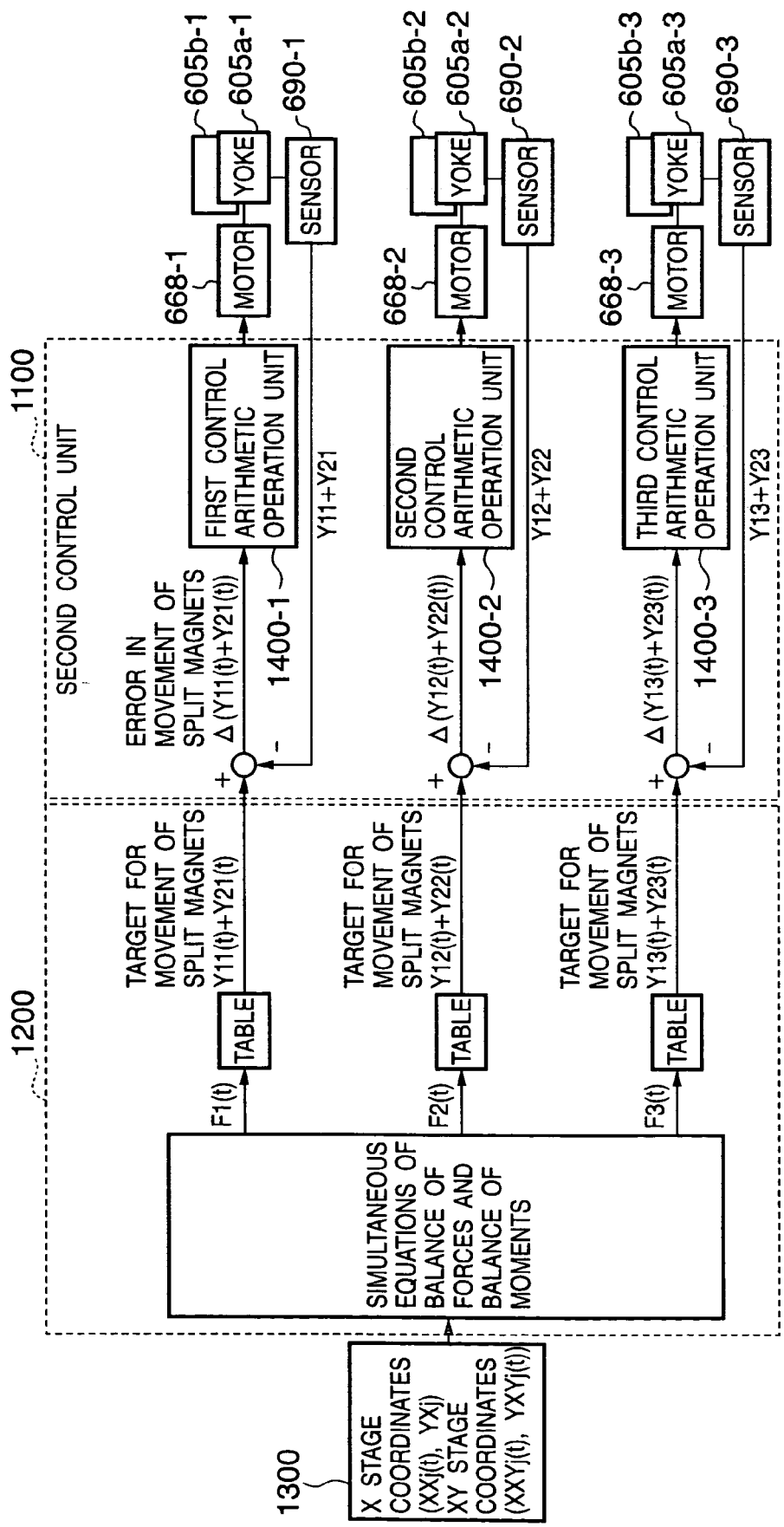
FIG. 11 is a control block diagram for controlling the variable support unit.
Figure 12:
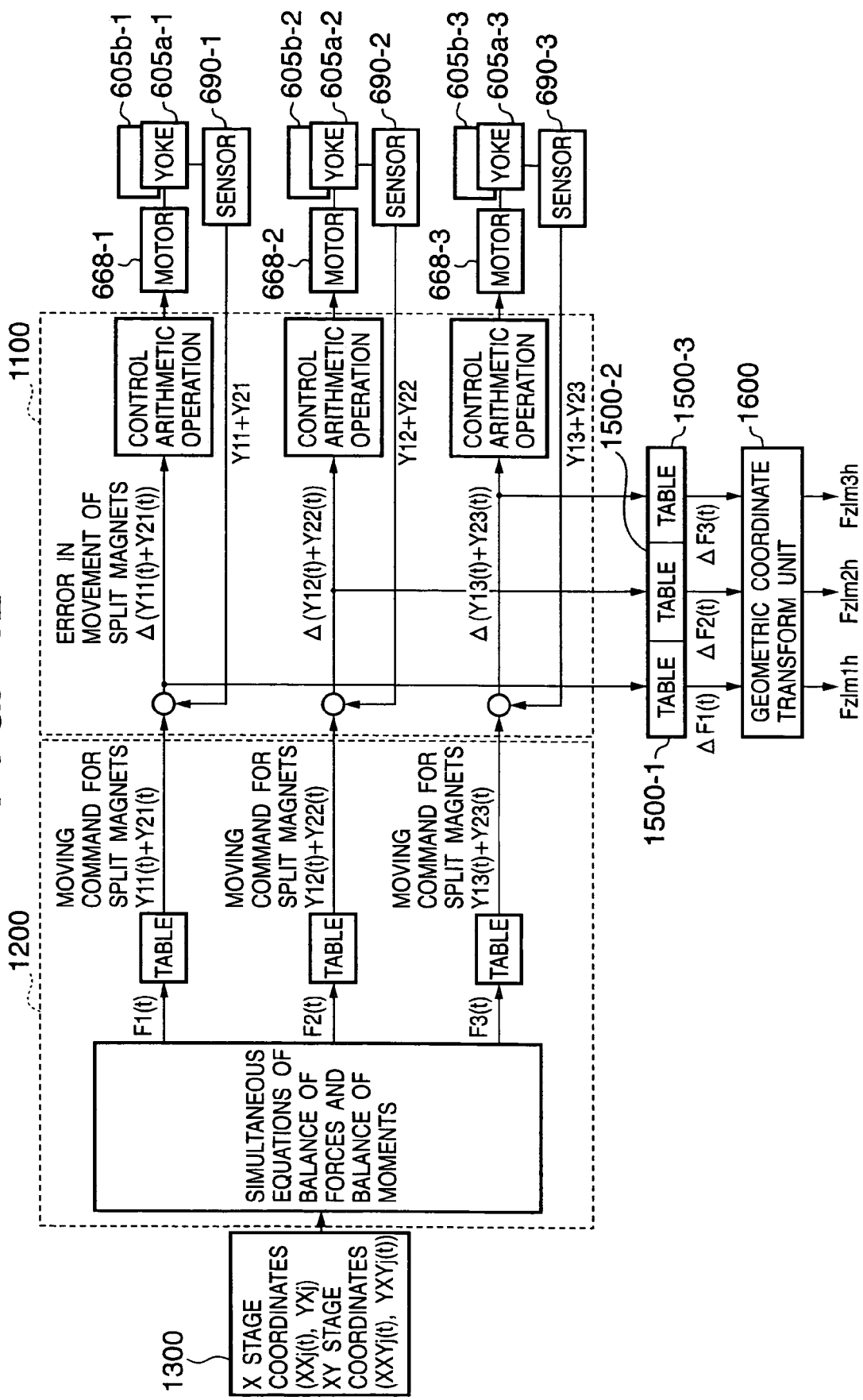
FIG. 12 is a control block diagram showing a modification of the control block diagram of FIG. 11.

The arrangement of FIG. 12 is different from that shown in FIG. 11 in that it has a geometric transform unit 1600, and tables (1500-1, 1500-2, and 1500-3) for compensating for errors in the forces, generated by the respective variable support units, with the fine movement linear motors. Errors Δ(Y1j+Y2j) (j=1 to 3) in the facing sizes of the respective variable support units are input to the tables (1500-1, 1500-2, and 1500-3), and correction support forces ΔF1(t), ΔF2(t), and ΔF3(t) that should be compensated for by the fine movement linear motors are obtained. On the basis of the correction support forces, the geometric coordinate transform unit 1600 generates and outputs fine movement linear motor outputs Fz1m1h, Fz1m2h, and Fz1m3h, equivalent to the correction support forces. As the fine movement linear motors have high response speeds, the errors in the support forces due to control delay, which is caused by setting the yokes variable, can be compensated for effectively. The three variable support units and three Z fine movement linear motors are arranged at different positions. Thus, the respective Z fine movement linear motors can generate the forces Fz1m1h, Fz1m2h, and Fz1m3h, equivalent to those obtained when the forces ΔF1(t), ΔF2(t), and ΔF3(t) are generated at the positions of the variable support units, through the geometric coordinate transform unit 1600.

As described above, and according to this embodiment, the support units can support with forces that can be changed in response to any change in barycenter that occurs in accordance with the moving load on the worktable 200.

When changes in coordinates of the X-Y stage system are sufficiently slow and the X-Y stage 703 moves quasistatically, no problem may occur. When, however, the X-Y stage 703 moves at a high speed, a reaction force of the acceleration in the X-Y direction occurs. This cannot be coped with by the three variable support units. Reaction force processing linear motors may be provided separately, and holding forces in synchronism with the acceleration may be generated. Alternatively, the 6-axis fine movement linear motors for position holding may be subjected to coordinate transformation, so that holding forces in synchronism with the acceleration may be generated.

(Utilization in Vacuum Environment)

The support units 300 and variable support units 380 described in the first and second embodiments can exhibit their characteristic features in a vacuum environment as well. In particular, since permanent magnets are mainly utilized as the constituent elements, pollution of the vacuum environment due to friction, or the like, or exhaust of compressed air need not be considered. Therefore, in a particularly highly clean environment in the semiconductor manufacturing process, or the like, any of the above embodiments is suitable as an anti-vibration apparatus for the semiconductor manufacturing apparatus.

Third Embodiment

Figure 13:
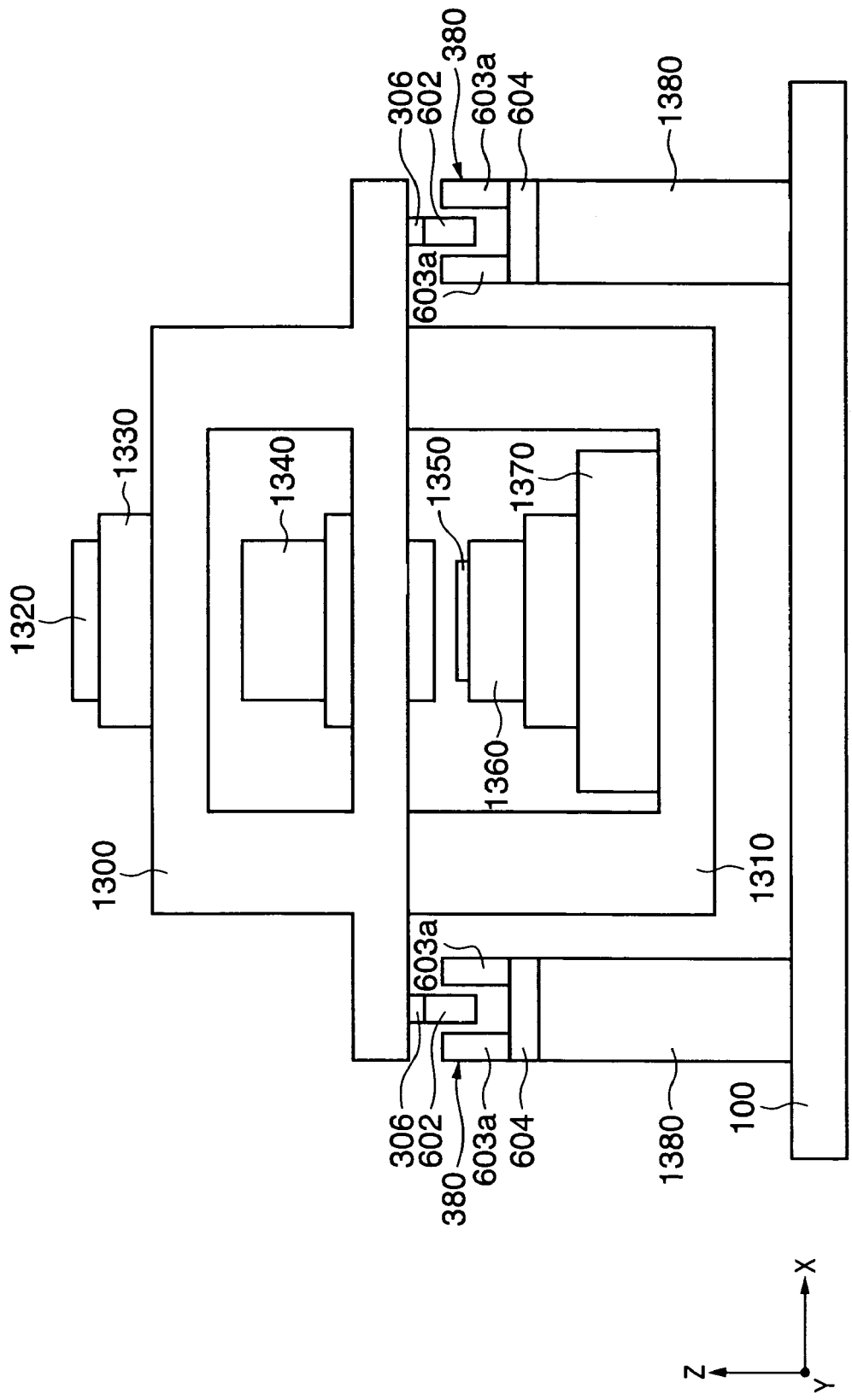
FIG. 13 is a view showing the schematic structure of a housing for an exposure apparatus according to the third embodiment.

An embodiment in which the support units, which are applied to the worktable 200 and described in the first and second embodiments above, are applied to an exposure apparatus, will be described with reference to FIG. 13. FIG. 13 is a view showing the schematic arrangement of a housing for the exposure apparatus. A projection lens 1340, and a reticle stage 1330 for holding a reticle 1320 as a master and moving and positioning it at a predetermined position, are arranged on an upper structure 1300. A wafer stage 1360 for moving and aligning a wafer 1350, to which the projection image of the master is to be transferred, at a predetermined position is arranged on a lower structure 1310.

Exposure light from a light source (not shown) irradiates the reticle 1320. The irradiation light is guided to the wafer 1350 through the projection lens 1340. The pattern of the reticle 1320 is projected onto the wafer 1350 and is transferred to the wafer 1350. The upper structure 1300 for mounting the reticle stage 1330 thereon and the lower structure 1310 for mounting the wafer stage 1360 thereon are integrally fixed. When the reticle stage 1330 and/or wafer 1350 is driven, a moving mass acts on each structure, and the force changes due to barycentric movement.

The upper structure 1300 is supported by variable support units 380 arranged on legs 1380 standing vertically from a base plate 100. In order to support a load that changes in response to the barycentric movement, the variable support units 380 variably control the support forces corresponding to predetermined axial directions. Thus, excitation caused by the changing load and acting on the upper and lower structures 1300 and 1310 can be controlled.

The variable support units 380 can also insulate the vibration propagating from the base plate 100, so it is not transmitted to the upper and lower structures 1300 and 1310.

Fourth Embodiment

Figure 14:
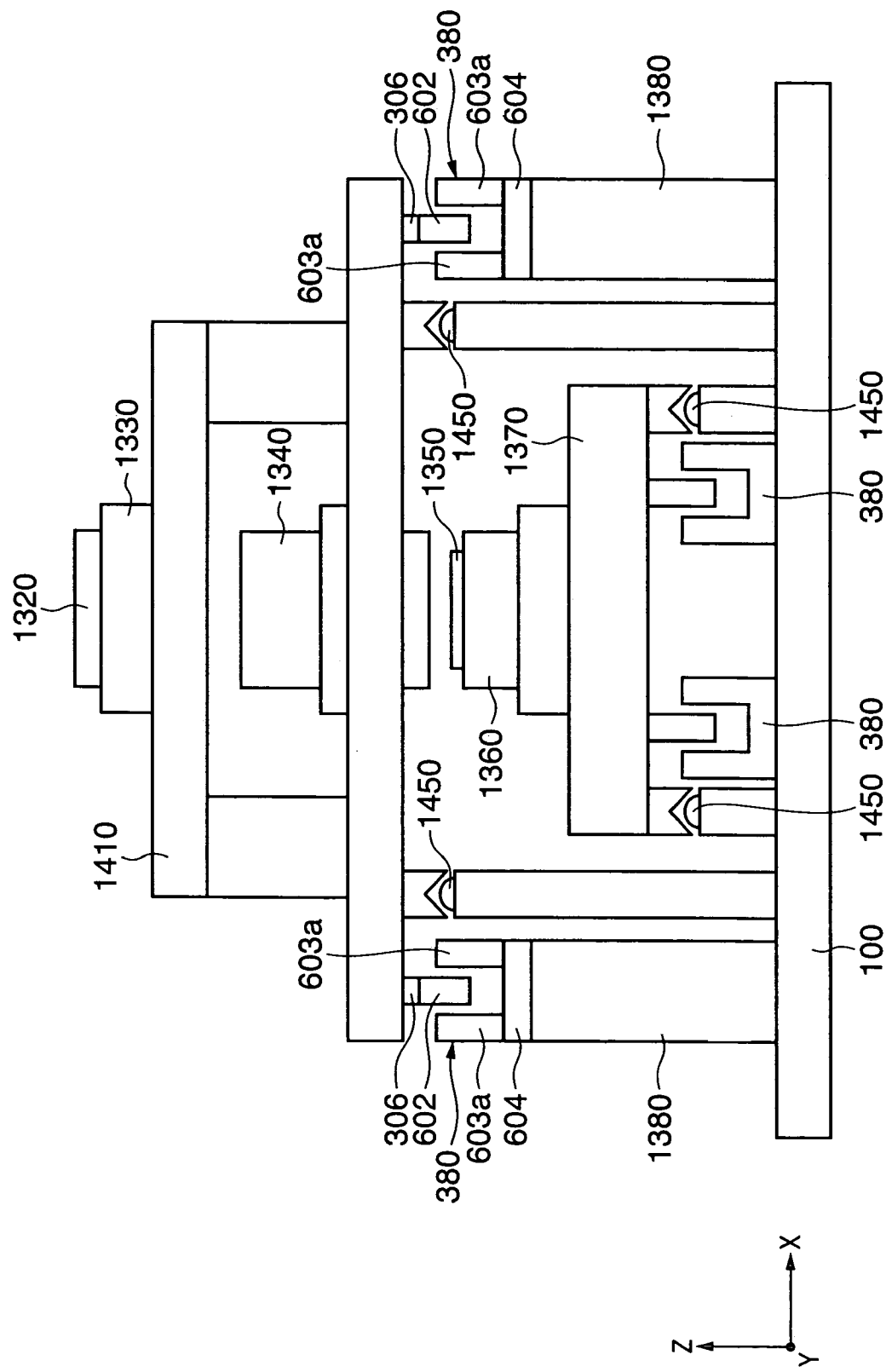
FIG. 14 is a view showing the schematic structure of a housing for an exposure apparatus according to the fourth embodiment.

An embodiment in which the support units, which are applied to the worktable and described in the first and second embodiments described above, are applied to an exposure apparatus will be described with reference to FIG. 14. FIG. 14 is a view showing the schematic structure of a housing for the exposure apparatus. A reticle stage system and projection lens are arranged on an upper structure 1410. A wafer stage 1360 is arranged on a surface plate 1370. A housing structure corresponding to the lower structure of FIG. 13 (third embodiment) does not exist in the fourth embodiment. The fourth embodiment is different from the third embodiment in these respects.

As is apparent from FIG. 14, the upper structure 1410 and surface plate 1370 are supported separately by kinematic mounts 1450 and variable support units 380, respectively, standing upright from a base plate 100.

The effect of the variable support units 380 is the same as that of the third embodiment described above, and a description thereof will accordingly be omitted.

Furthermore, according to this embodiment, since the reticle stage and projection lens, and the wafer stage are supported by separate structures, in order to set their geometrical positions to correspond to each other, the kinematic mounts 1450 are arranged on the bottom portions of the upper structure 1410 and of the surface plate 1370. Position sensors (e.g., the gap sensors 550, 560, and 570 of FIG. 6D) may be initialized with reference to a state wherein the upper structure 1410 and the surface plate 1370 for mounting the wafer stage 1360 thereon are landed on the kinematic mounts 1450 (a state before generating support forces; a relationship of the total repulsive force of the permanent magnets<support forces is satisfied). The variable support units 380 may be controlled in position and posture on the basis of the initial positions.

In this case, the structure is landed on the kinematic mounts 1450. A shift in the translating position in the planar direction and a shift of the posture in the rotational direction are corrected with reference to the landed position of the structure as the initial value. Thus, forces for holding a predetermined position and posture can be generated by the variable support units 380. In the above embodiments, the support forces are made variable so that the force generated by any barycentric change may be absorbed. When no barycentric change occurs and merely the structure is to be moved vertically as well, the support forces may be changed by controlling the positions of the second permanent magnets, so that initial mismatching of the position and posture can be solved easily.

Fifth Embodiment

Figure 15:
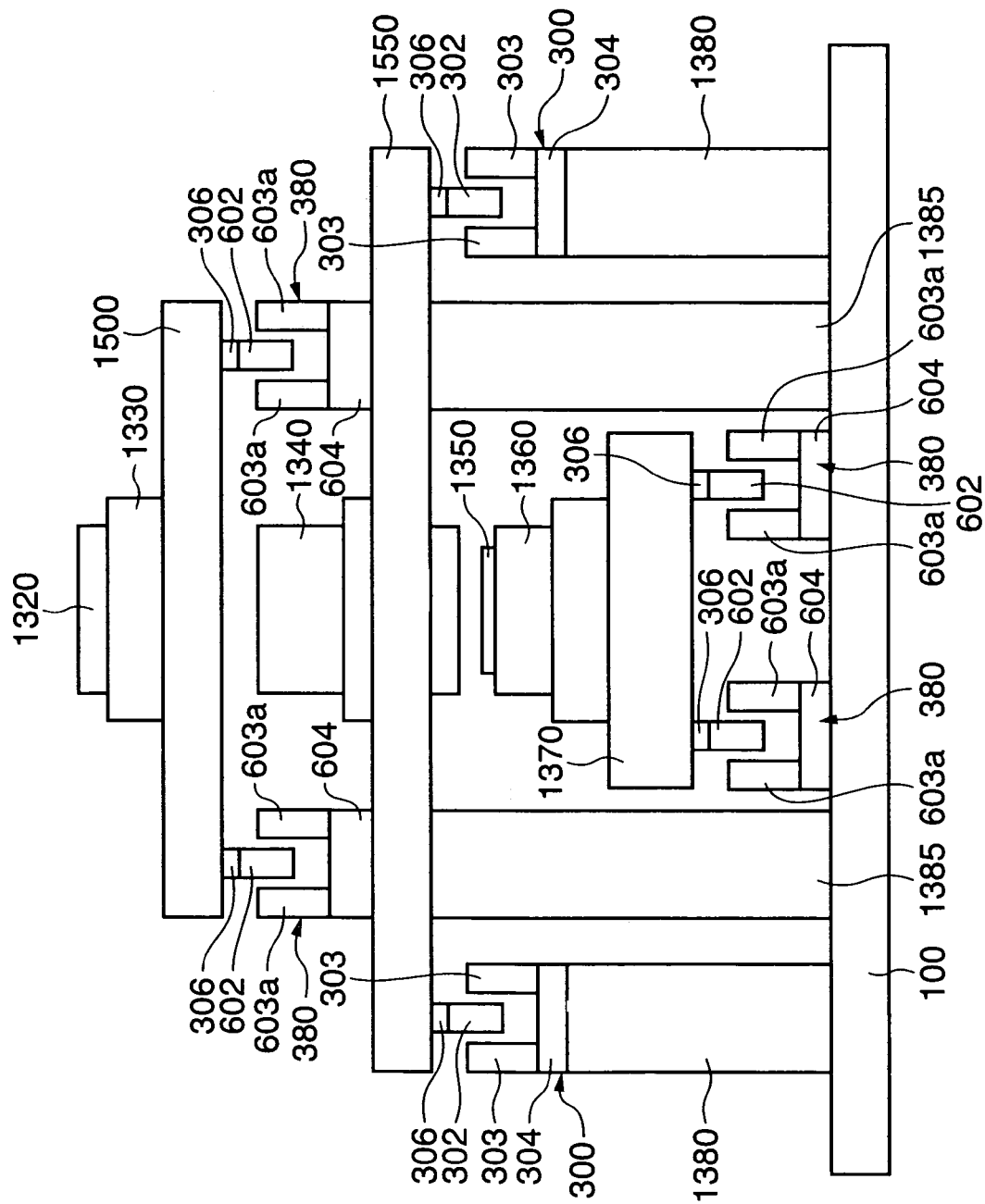
FIG. 15 is a view showing the schematic structure of a housing for an exposure apparatus according to the fifth embodiment.

FIG. 15 is a view showing the schematic structure of a housing for an exposure apparatus according to the fifth embodiment. A reticle stage 1330 is arranged on an upper structure 1500. A wafer stage 1360 is arranged on a surface plate 1370. A projection lens 1340 is arranged on an optical system structure 1550. As the stage moves, a dynamic load is generated in the upper structure 1500 and surface plate 1370. The dynamic load is absorbed by variable support units 380. No barycentric movement occurs in the optical system structure 1550, but only a static load acts on it. Thus, the structure 1550 is supported by support units 300 identical to those shown in the first embodiment.

According to this embodiment, even if a case wherein a barycentric movement caused by a moving load occurs and a case wherein a static load acts are present in a mixed manner, their influences can be removed effectively.

Sixth Embodiment

Figure 16:
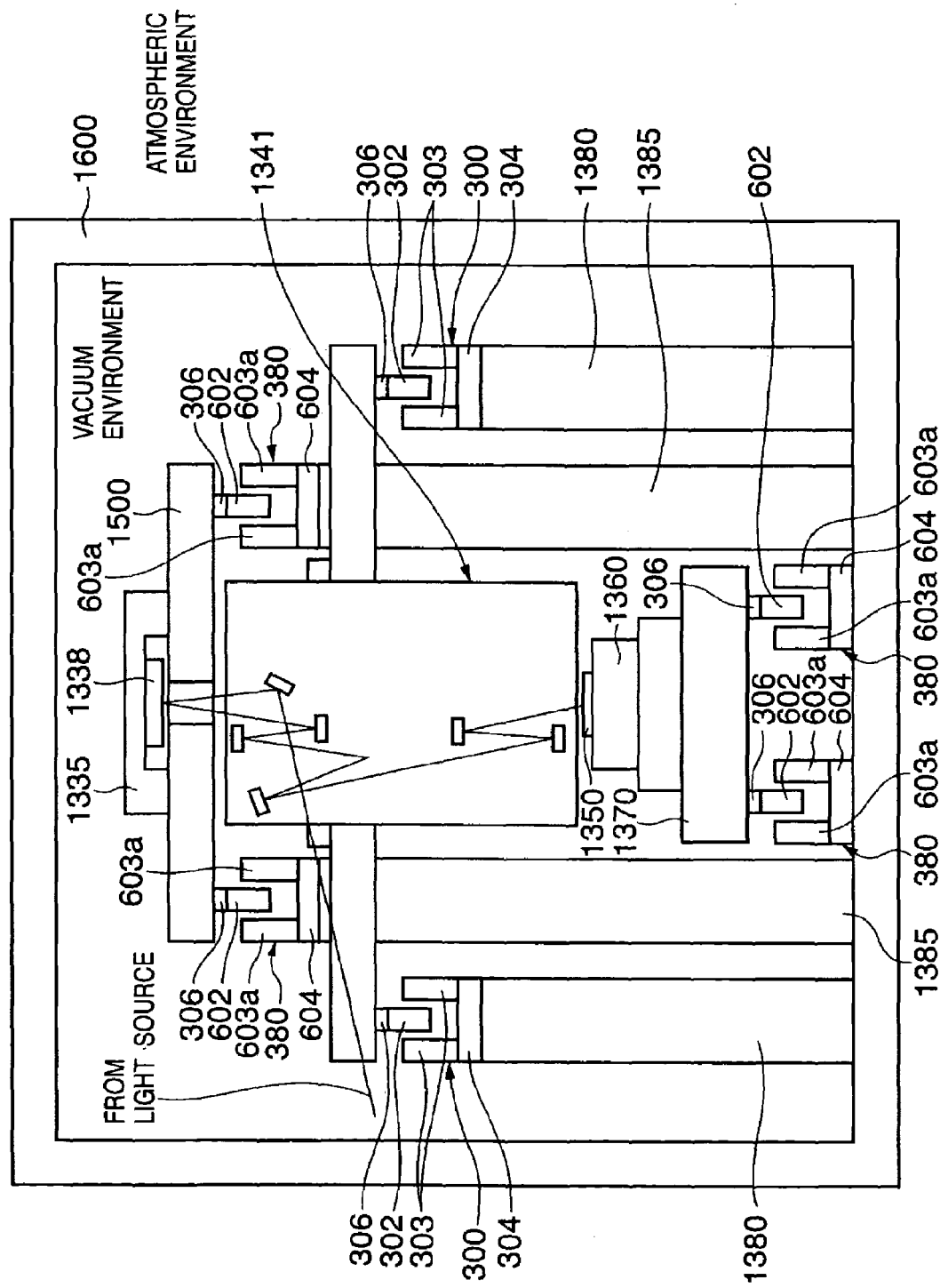
FIG. 16 is a view showing the schematic structure of a housing for an exposure apparatus according to the sixth embodiment.

FIG. 16 is a view showing the schematic structure of a housing for an exposure apparatus according to the sixth embodiment. A housing structure for a vacuum chamber 1600 is identical to that described in the fifth embodiment, and a detailed description thereof will accordingly be omitted. The sixth embodiment is different from the fifth embodiment described above in that an extreme ultraviolet (EUV) exposure apparatus is considered as the exposure apparatus, and that the exposure apparatus is used in a vacuum environment. In the vacuum environment as well, variable support units 380 or support units 300 do not use air or rubber, and accordingly, pollution of the vacuum environment by exhaust of air, wear of the rubber, or the like, can be prevented. The support units 300 and variable support units 380 are suitably applied for anti-vibration of the extreme ultraviolet (EUV) exposure apparatus installed in the vacuum chamber 1600.

<Application to a Semiconductor Manufacturing Process>

A process for manufacturing a semiconductor device (e.g., a semiconductor chip such as an IC or an LSI, a CCD, a liquid crystal panel, and the like) using the above exposure apparatus will be described with reference to FIG. 17.

Figure 17:
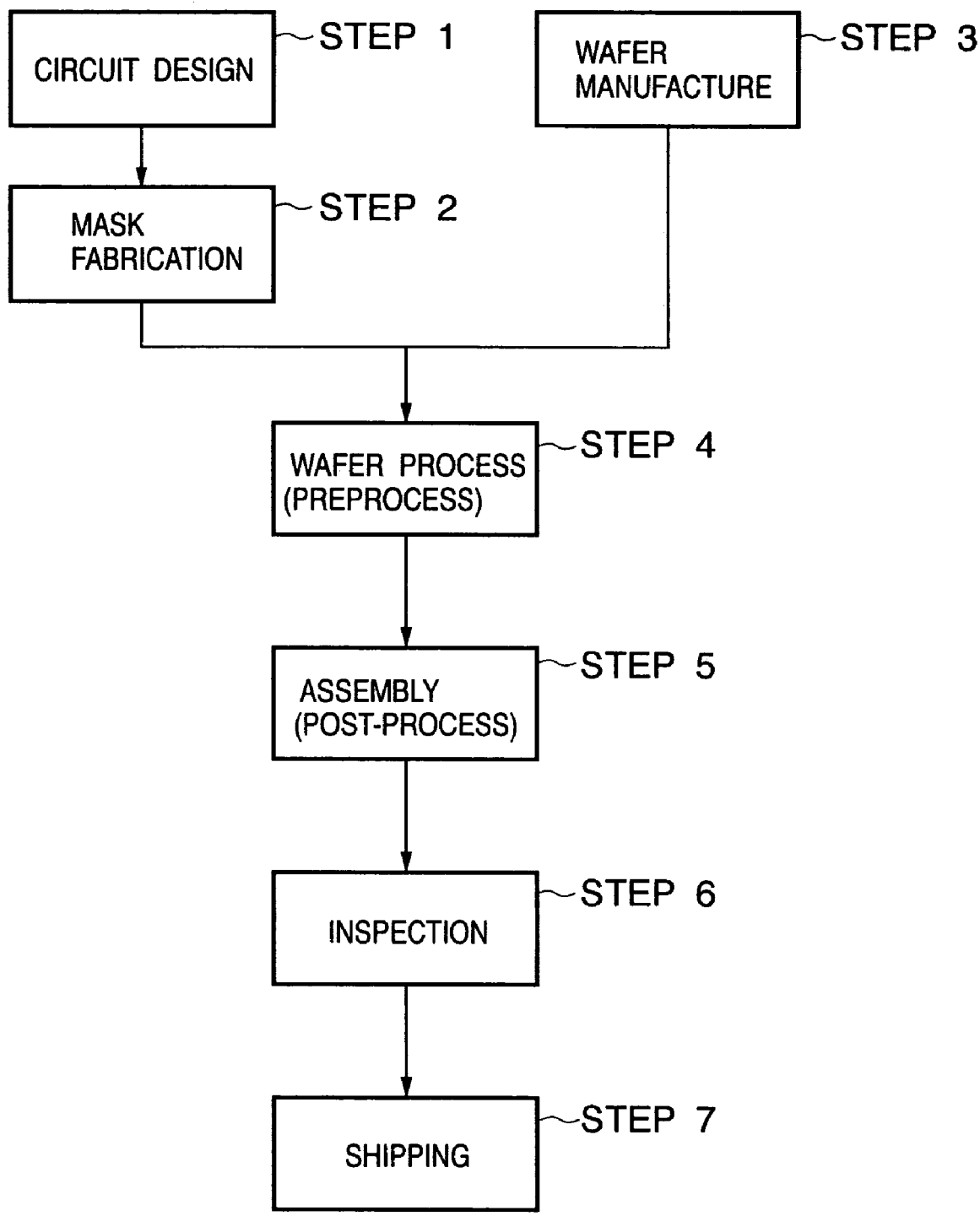
FIG. 17 is a flow chart showing the flow of a device manufacturing process.

FIG. 17 shows the flow of the overall semiconductor device manufacturing process. In step 1 (circuit design), the circuit of a semiconductor device is designed. In step 2, exposure control data for the exposure apparatus is created based on the designed circuit pattern. In step 3 (wafer manufacture), a wafer is manufactured using a material such as silicon. In step 4 (wafer process), called a preprocess, an actual circuit is formed on the wafer by lithography using the prepared mask and wafer. In step 5 (assembly), called a post-process, a semiconductor chip is formed from the wafer fabricated in step 4. This step includes processes such as assembly (dicing and bonding) and packaging (chip encapsulation). In step 6 (inspection), inspections including an operation check test and a durability test of the semiconductor device fabricated in step 5 are performed. A semiconductor device is completed with these processes, and shipped (step 7).

The wafer process of step 4 has the following steps: an oxidation step of oxidizing the surface of the wafer, a CVD step of forming an insulating film on the wafer surface, an electrode formation step of forming an electrode on the wafer by deposition, an ion implantation step of implanting ions into the wafer, a resist processing step of applying a photosensitive agent to the wafer, an exposure step of transferring the circuit pattern to the wafer after the resist processing step with the exposure apparatus described above, a developing step of developing the wafer exposed in the exposure step, an etching step of etching portions other than the resist image developed in the developing step, and a resist removal step of removing any unnecessary resist after etching. By repeating these steps, a multilayered structure of circuit patterns is formed on the wafer.

When the exposure apparatus described above is used, the exposure accuracy and the apparatus throughput can be increased. Thus, the productivity of the semiconductor devices can be increased when compared to the conventional case.

According to the embodiments described above, an anti-vibration technique including a support structure which, while generating a support force in a support direction, suppresses transmission of a force in a direction perpendicular to the support direction, can be provided.

According to one embodiment, even when the load conditions (barycentric position, or the like) for the anti-vibration target object change dynamically, the support force of the support structure can be controlled variably, thereby eliminating vibration.

As many apparently widely different embodiments of the present invention can be made without departing from the spirit and scope thereof, it is to be understood that the invention is not limited to the specific embodiments thereof except as defined in the appended claims.

What is claimed is:

1. A supporting apparatus for supporting a member, which mounts a movable stage, above a base, said apparatus comprising:
   a permanent magnet arranged on one of the member and the base;
   a pair of permanent magnets arranged on the other of the member and the base, and arranged so that said permanent magnet is interposed therebetween; and
   a linear motor which is arranged between the member and the base, and provides a force which acts on the member,
   wherein magnetized directions of said permanent magnet and said pair of permanent magnets are perpendicular to a gravity direction, which is a direction of gravity acting on the member, and
   a width of said pair of permanent magnets is different from a width of said permanent magnet in a direction perpendicular to the magnetized directions and the gravity direction, and
   said permanent magnet and said pair of permanent magnets are configured to generate a force in the gravity direction and to support the member above the base in the gravity direction through the force.

2. The apparatus according to claim 1, wherein said pair of permanent magnets are arranged on the base.

3. The apparatus according to claim 2, further comprising changing means for changing a region in which said permanent magnet and said pair of permanent magnets face each other.

4. The apparatus according to claim 3, wherein said changing means moves said pair of permanent magnets in a direction perpendicular to the magnetized directions and the gravity direction.

5. The apparatus according to claim 1, wherein said permanent magnet and said pair of permanent magnets are arranged so that a spring constant is substantially zero in the direction perpendicular to the magnetized directions and the gravity direction.

6. An exposure apparatus for exposing a substrate to a pattern, said apparatus comprising:
   a movable stage which holds the substrate;
   a member which mounts said movable stage; and
   a supporting apparatus, as defined in claim 1, for supporting said member.

7. A method of manufacturing a device, said method comprising:
   a step of exposing a substrate to a pattern by using an exposure apparatus as defined in claim 6;
   a step of developing the substrate; and
   a step of processing the developed substrate to manufacture the device.

8. A supporting apparatus for supporting a member, which mounts a movable stage, above a base, said apparatus comprising:
   a permanent magnet arranged on the member, and magnetized in a first direction perpendicular to a gravity direction, which is a direction of gravity acting on the member;
   a pair of permanent magnets arranged on the base, and arranged so that said permanent magnet is interposed therebetween; and
   driving means for driving said pair of permanent magnets, in order to change a facing area of said permanent magnet and said pair of permanent magnets, in a second direction perpendicular to the first direction and the gravity direction,
   wherein said permanent magnet and said pair of permanent magnets are configured to generate a force in the gravity direction and to support the member above the base in the gravity direction through the force.

9. An exposure apparatus for exposing a substrate to a pattern, said apparatus comprising:
   a movable stage which holds the substrate;
   a member which mounts said movable stage; and
   a supporting apparatus, as defined in claim 8, for supporting said member mounted.

10. A method of manufacturing a device, said method comprising:
    a step of exposing a substrate to a pattern by using an exposure apparatus as defined in claim 9;
    a step of developing the substrate; and
    a step of processing the developed substrate to manufacture the device.

11. The apparatus according to claim 1, wherein the width of said pair of permanent magnets is larger than the width of said permanent magnet in the direction perpendicular to the gravity direction and the magnetized directions.

12. The apparatus according to claim 8, wherein said driving means is controlled based on information related to a position of the movable stage.

* * * * *

UNITED STATES PATENT AND TRADEMARK OFFICE
CERTIFICATE OF CORRECTION

PATENT NO. : 7,383,929 B2
APPLICATION NO. : 10/782785
DATED : June 10, 2008
INVENTOR(S) : Nobushige Korenaga It is certified that error appears in the above-identified patent and that said Letters Patent is hereby corrected as shown below:

ON THE COVER PAGE:
In item "(56) References Cited," under "FOREIGN PATENT DOCUMENTS," the first two listed documents "JP     04027696 A * 1/1992
    JP     07267192 A * 10/1995"
should read as follows:

-- JP    4-27696   A *   1/1992
   JP    7-267192  A *   10/1995 --.

COLUMN 2:
Line 32, "the-foregoing" should read -- the foregoing --.

COLUMN 9:
Line 58, "coincide" should read -- coincides --.

COLUMN 10:
Line 29, "the-variable" should read -- the variable --.
Lines 61-62, "$F1+Y1+F2\times Y2+F3\times Y3+(MK+YK+MX\times YXj+MXY\times YXYj(t))g=0$" should read -- $F1\times Y1+F2\times Y2+F3\times Y3+(MK\times YK+MX\times YXj(t)+MXY\times YXYj(t))g=0$ --.

COLUMN 12:
Line 1, "is" should read -- are --.
Line 2, "yokes" should read -- yokes to be --.

Signed and Sealed this

Sixteenth Day of November, 2010

David J. Kappos
*Director of the United States Patent and Trademark Office*